(12) United States Patent
Jung et al.

(10) Patent No.: US 10,754,546 B2
(45) Date of Patent: Aug. 25, 2020

(54) ELECTRONIC DEVICE AND METHOD FOR EXECUTING FUNCTION USING INPUT INTERFACE DISPLAYED VIA AT LEAST PORTION OF CONTENT

(71) Applicant: Samsung Electronics Co., Ltd., Gyeonggi-do (KR)

(72) Inventors: Ilhoe Jung, Seoul (KR); Kihwan Choi, Gyeonggi-do (KR); Jinjoo Park, Seoul (KR); Daemyung Kim, Gyeonggi-do (KR); Haksoo Kim, Gyeonggi-do (KR); Yoonjeong Heo, Gyeonggi-do (KR); Min-Jung Kim, Gyeonggi-do (KR); Ji-Yoon Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/161,240

(22) Filed: Oct. 16, 2018

(65) Prior Publication Data
US 2019/0114075 A1 Apr. 18, 2019

(30) Foreign Application Priority Data
Oct. 17, 2017 (KR) .......................... 10-2017-0134879

(51) Int. Cl.
*G09G 5/00* (2006.01)
*G06F 3/0488* (2013.01)
(Continued)

(52) U.S. Cl.
CPC .......... *G06F 3/04886* (2013.01); *G06F 3/012* (2013.01); *G06F 3/04815* (2013.01);
(Continued)

(58) Field of Classification Search
CPC ...... G06F 3/011; G06F 3/017; G06F 3/04815; G06F 3/04842; G06F 3/0346;
(Continued)

(56) References Cited

U.S. PATENT DOCUMENTS

| 2014/0028562 | A1* | 1/2014 | St. Clair | ............. | G06F 3/04883 345/168 |
| 2014/0310638 | A1* | 10/2014 | Lee | ..................... | G06F 3/04886 715/773 |

(Continued)

FOREIGN PATENT DOCUMENTS

| JP | 2003-91353 A | 3/2003 |
| JP | 2017-4545 A | 1/2017 |

(Continued)

OTHER PUBLICATIONS

International Search Report dated Jan. 25, 2019.
European Search Report dated Jul. 8, 2020.

*Primary Examiner* — Duc Q Dinh
(74) *Attorney, Agent, or Firm* — Cha & Reiter, LLC.

(57) ABSTRACT

An electronic device and method are disclosed. The electronic device includes a display and a processor, which implements the method, including: displaying virtual reality image, a virtual keyboard including a plurality of keys indicating a plurality of characters, and a representation of an external electronic device superimposed on the virtual reality image, wherein the virtual keyboard is displayed in a virtual touch pad area of the representation corresponding to a touch pad of the external electronic device, receiving information regarding a first touch input, transmitted from the external electronic device in response to detecting the first touch input on the touch pad, identifying, using the received information, a key corresponding to the first touch input from among the plurality of keys, and displaying, in at least a portion of the virtual reality image, a character (Continued)

indicated by the identified key on at least portion of the image.

20 Claims, 23 Drawing Sheets

(51) Int. Cl.
*G06F 3/0484* (2013.01)
*G06F 3/01* (2006.01)
*G06F 3/0481* (2013.01)
*G09G 5/38* (2006.01)
*G09G 5/377* (2006.01)
*G06F 3/02* (2006.01)

(52) U.S. Cl.
CPC ...... *G06F 3/04842* (2013.01); *G06F 3/04845* (2013.01); *G06F 3/02* (2013.01); *G09G 5/377* (2013.01); *G09G 5/38* (2013.01); *G09G 2354/00* (2013.01)

(58) Field of Classification Search
CPC ........ G06F 3/0482; G06F 3/016; G06F 3/014; G06F 3/04845; G06F 3/04883; G06F 2203/0331; G06F 3/03547; G06F 3/04886; G06F 3/04847; G06F 16/7837; G06F 1/1694; G06F 3/0487; G06F 16/444; G06F 2203/04108; G06F 3/0354; G06F 2203/0338; G06F 3/012; G06F 3/013; G06F 2203/0384; G06F 21/84; G06F 3/048; G06F 3/0488; G02B 27/017; G02B 2027/0178; G02B 2027/0141; G02B 27/01
See application file for complete search history.

(56) References Cited

U.S. PATENT DOCUMENTS

| | | |
|---|---|---|
| 2015/0123895 A1 | 5/2015 | Takano |
| 2016/0109937 A1 | 4/2016 | Kim et al. |
| 2016/0363996 A1 | 12/2016 | Higgins et al. |
| 2016/0370994 A1* | 12/2016 | Galu, Jr. ............. G06F 3/04883 |
| 2017/0083104 A1 | 3/2017 | Namba et al. |
| 2017/0140484 A1 | 5/2017 | Lete et al. |
| 2017/0185214 A1* | 6/2017 | Kojima ................... G06F 3/012 |
| 2017/0235484 A1* | 8/2017 | Griffin ................ H04M 1/0214 715/773 |
| 2017/0262045 A1 | 9/2017 | Rouvinez et al. |
| 2017/0364198 A1* | 12/2017 | Yoganandan ......... G06F 3/0346 |
| 2018/0053337 A1* | 2/2018 | Nakashima ............. G06F 3/012 |
| 2018/0232106 A1* | 8/2018 | Zhang ................... G06F 3/0426 |

FOREIGN PATENT DOCUMENTS

| | | |
|---|---|---|
| KR | 10-2015-0132896 A | 11/2015 |
| KR | 10-2016-0044272 A | 4/2016 |
| KR | 10-2017-0026164 A | 3/2017 |
| KR | 10-2017-0084458 A | 7/2017 |

* cited by examiner

ELECTRONIC DEVICE AND METHOD FOR EXECUTING FUNCTION USING INPUT INTERFACE DISPLAYED VIA AT LEAST PORTION OF CONTENT

CROSS-REFERENCE TO RELATED APPLICATION(S)

This application is based on and claims priority under 35 U.S.C. § 119 to Korean Patent Application No. 10-2017-0134879, filed on Oct. 17, 2017, in the Korean Intellectual Property Office, the disclosure of which is incorporated by reference herein in its entirety.

BACKGROUND

1) Field

Various embodiments relate to an electronic device and method thereof for executing a function using an input interface displayed through at least a portion of contents.

2) Description of Related Art

The above information is presented as background information only to assist with an understanding of the present disclosure. No determination has been made, and no assertion is made, as to whether any of the above might be applicable as prior art with regard to the present disclosure.

Due to the development of technology, electronic device capable of virtual reality (VR) imagery have become widespread. Such electronic devices may include functions for inputting character text, for display in the VR image generated on a display of the electronic device.

SUMMARY

A user viewing an image for VR through an electronic device may have a limited field of view. Due to this limited field of view, inputting a character in the image for VR being displayed on the display of the electronic device may cause inconvenience.

Various embodiments provide an electronic device and method for inputting a character to an image for VR using a virtual keyboard provided within (or adjacent to) a touch input on an external electronic device and a representation corresponding to the external electronic device.

The technical subjects pursued in the present disclosure may not be limited to the above mentioned technical subjects, and other technical subjects which are not mentioned may be clearly understood, through the following descriptions, by those skilled in the art of the present disclosure.

An electronic device according to various embodiments may include: a memory storing instructions, a display, a communication circuitry, and at least one processor operably coupled to the memory, the display, the communication circuitry, the at least one processor configured to execute the stored instructions to cause the electronic device to: display a virtual reality image using the display, display a virtual keyboard including a plurality of keys indicating a plurality of characters, and a representation of an external electronic device superimposed on the virtual reality image, wherein the virtual keyboard is displayed in a virtual touch pad area of the representation, corresponding to a touch pad of the external electronic device, receive information regarding a first touch input, the received information transmitted from the external electronic device in response to detecting the first touch input on the touch pad, identify, using the received information, a key corresponding to the first touch input from among the plurality of keys, and display, in at least a portion of the virtual reality image, a character indicated by the identified key.

An electronic device according to various embodiments may include: displaying a virtual reality image, displaying a virtual keyboard including a plurality of keys indicating a plurality of characters and a representation of an external electronic device superimposed on the virtual reality image, wherein the virtual keyboard is displayed in a virtual touch pad area of the representation, corresponding to a touch pad of the external electronic device, receiving information regarding a first touch input, the received information transmitted from the external electronic device in response to detecting the first touch input on the touch pad, identifying, using the received information, a key corresponding to the first touch input from among the plurality of keys, and displaying, in at least a portion of the virtual reality image, a character indicated by the identified key on at least portion of the image.

A non-transitory computer-readable storage medium according to various embodiments may store one or more programs for executing to: display a virtual reality image, display a virtual keyboard including a plurality of keys indicating a plurality of characters, and a representation of an external electronic device superimposed on the virtual reality image, wherein the virtual keyboard is displayed in a virtual touch pad area of the representation, corresponding to a touch pad of the external electronic device, receive information regarding a first touch input, the received information transmitted from the external electronic device in response to detecting the first touch input on the touch pad, identify, using the received information, a key corresponding to the first touch input from among the plurality of keys, display, in at least a portion of the virtual reality image, a character indicated by the identified key.

A method of an electronic device according to various embodiments may include: displaying contents through a display of the electronic device; acquiring data regarding a movement of an external electronic device including a touch sensor through a communication module of the electronic device; moving a graphic object corresponding to a shape of the external electronic device displayed over at least a portion of the contents through the display to correspond to the movement, using the data; displaying one or more virtual interfaces capable of executing one or more functions through the display to correspond to an area displayed in a shape corresponding to the touch sensor of the external electronic device among the graphic objects on the basis of at least an input, acquiring an input to the touch sensor and location information corresponding to the input to the touch sensor from the external electronic device through the communication module; identifying a virtual interface corresponding to the location information among the one or more virtual interfaces, on the basis of at least the input to the touch sensor; and executing a function associated with the identified virtual interface among the one or more designated functions.

A method of an electronic device according to various embodiments may include: displaying an omnidirectional image; displaying a virtual keyboard including a plurality of keys indicating a plurality of characters within an area associated with a virtual touch pad corresponding to a touch pad of the external electronic device included in a representation of the external electronic device superimposed on the omnidirectional image; receiving information regarding a first touch input to the touch pad transmitted from the external electronic device in response to detecting the first touch input to the touch pad by the external electronic device; identifying a key corresponding to the first touch input among the plurality of keys based on the reception; and displaying a character indicated by the identified key over at least a portion of the omnidirectional image.

As described above, an electronic device and method thereof according to various embodiments may input a character to an image for VR using a virtual keyboard provided within (or adjacent to) a touch input on an external electronic device and a representation corresponding to the external electronic device, thereby providing enhanced user experience (UX).

Effects which can be acquired by the present disclosure are not limited to the above described effects, and other effects that have not been mentioned may be clearly understood by those skilled in the art from the following description.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
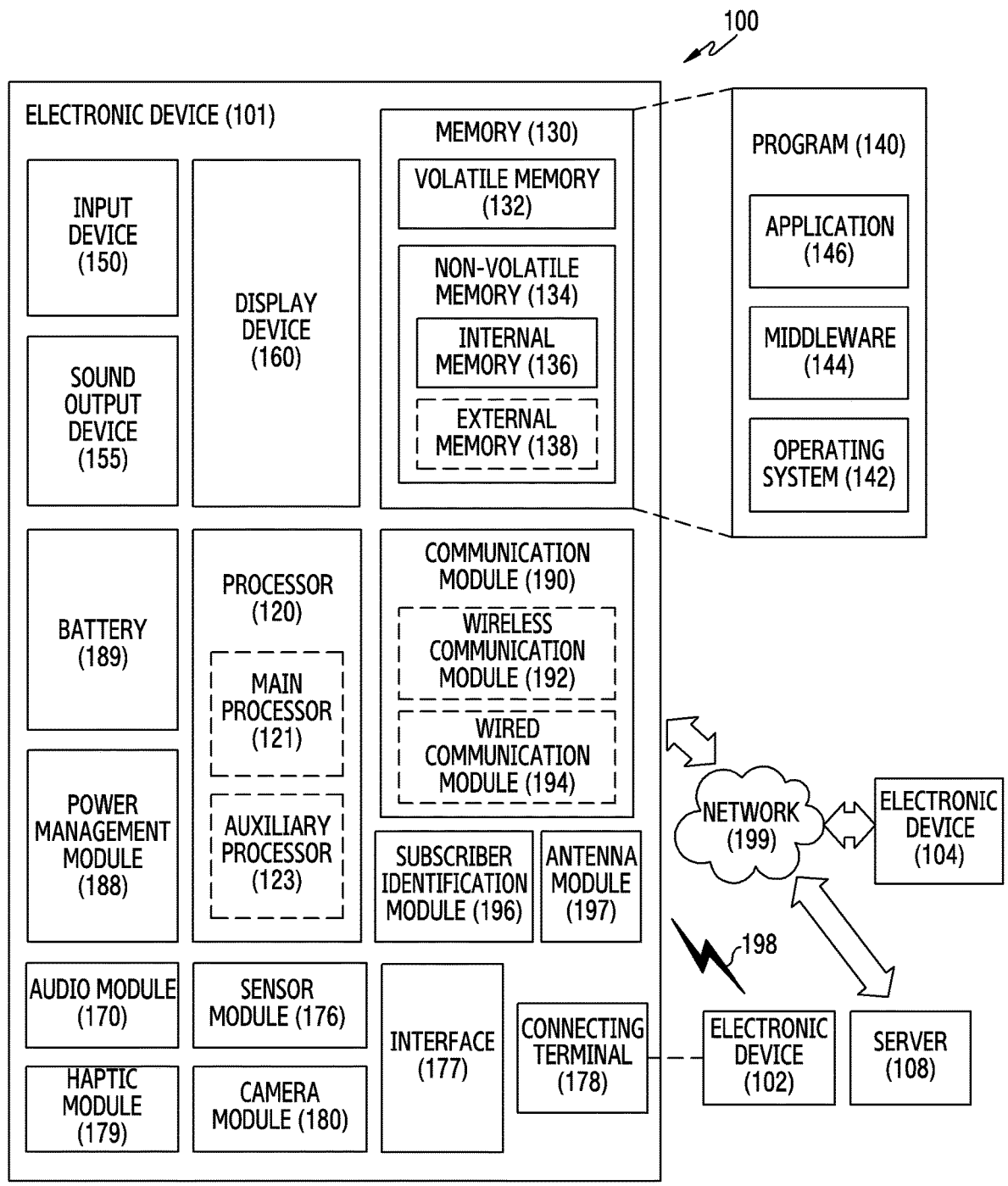
FIG. 1 is a block diagram illustrating an electronic device for executing a function using an input interface displayed through at least a portion of contents in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Notably, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
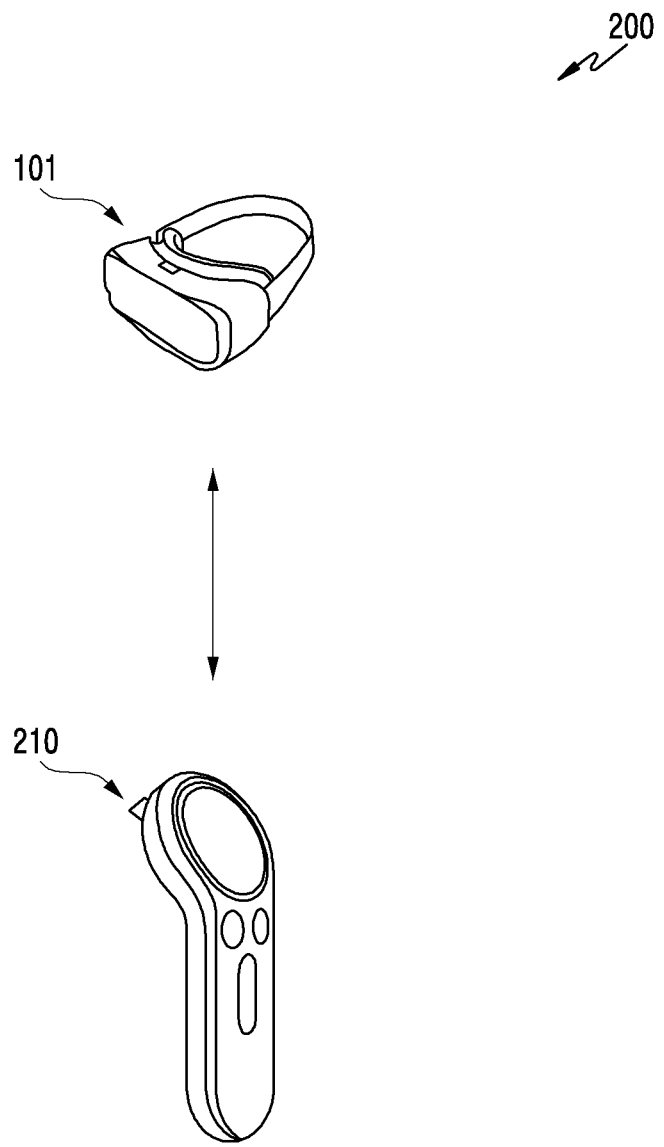
FIG. 2 illustrates an example of an environment that includes an electronic device and an external electronic device according to various embodiments.

FIG. 2 illustrates an example of an environment that includes an electronic device and an external electronic device according to various embodiments.

Referring to FIG. 2, an environment 200 may include an electronic device 101 and an external electronic device 210.

The electronic device 101 may provide a screen through a display (e.g., display device 160) of the electronic device 101. According to various embodiments, the electronic device 101 may display contents through the display (e.g., display device 160) of the electronic device 101. The contents may include one or more of an image for virtual reality (VR) and an omnidirectional image.

In various embodiments, the electronic device 101 may include a housing that configures the external appearance of the electronic device 101. The housing may be configured to be mounted on a user's head. The electronic device 101 may provide the image for VR or the omnidirectional image while being mounted on the user's head through the housing.

In various embodiments, the electronic device 101 may be coupled to another apparatus (not shown in FIG. 2). The other apparatus may include a housing. The housing of the other apparatus may configure the external appearance of the other apparatus. The housing of the other apparatus may be configured to be mounted on a user's head. The housing of the other apparatus may be configured to be coupled to the electronic device 101. The electronic device 101 may provide an image for VR or an omnidirectional image while being coupled to the other apparatus.

In various embodiments, the electronic device 101 may communicate with an external electronic device 210. The electronic device 101 may generate a communication path between the external electronic device 210 and the electronic device 101. In various embodiments, the communication path may be an indirect communication path that utilizes an intermediate node such as an access point (AP), a base station, or the like. For example, the communication path may include one or more of a cellular communication scheme-based path such as long Term Evolution (LTE) and a wireless local area network (WLAN) communication scheme-based path such as wireless fidelity (Wi-Fi). In various embodiments, the communication path may be a direct communication path that does not utilize the intermediate node. For example, the communication path may include one or more of a Bluetooth communication scheme-based path, a Bluetooth low energy communication scheme-based path, an LTE sidelink communication scheme-based path, and a Wi-Fi direct communication scheme-based path. In various embodiments, the communication path may be a wired communication path or a wireless communication path. The electronic device 101 may receive signals, data, information, or messages from the external electronic device 210 via the communication path. The electronic device 101 may transmit signals, data, information, or messages to the external electronic device 210 via the communication path.

The external electronic device 210 may be configured to control at least some of the functions of the electronic device 101. In various embodiments, the external electronic device 210 may be configured to remotely control at least one function associated with VR among the functions of the electronic device 101. In various embodiments, the external electronic device 210 may be referred to as a controller, a joypad, or the like.

In various embodiments, the external electronic device 210 may include a housing. The housing may configure the external appearance of the external electronic device 210. In various embodiments, the external electronic device 210 may include at least one input device for controlling at least one function of the electronic device 101 associated with VR. The at least one input device may be exposed through a portion of the housing of the external electronic device 210. In various embodiments, the at least one input device may include one or more of a touch pad capable of receiving a touch input, a physical button capable of receiving physical pressure, and a sensor module capable of detecting a change in the movement of the external electronic device 210.

In various embodiments, the external electronic device 210 may communicate with the electronic device 101. The external electronic device 210 may transmit signals, data, information, or messages to the electronic device 101 via the communication path. The external electronic device 210 may receive signals, data, information, or messages from the electronic device 101 via the communication path. For example, the external electronic device 210 may transmit information regarding an input received or detected via the at least one input device to the electronic device 101 via the communication path. The transmitted information may be utilized to control the at least one function of the electronic device 101 associated with VR. As another example, the external electronic device 210 may receive a message or signal for requesting a connection to the external electronic device 210 from the electronic device 101 via the communication path.

Figure 3:
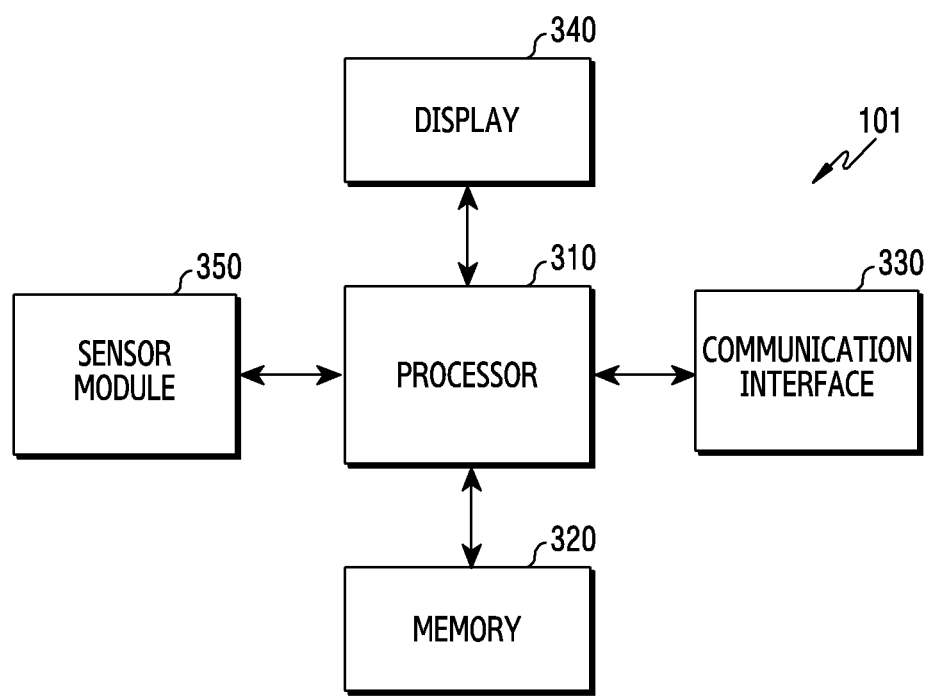
FIG. 3 illustrates an example of the functional configuration of an electronic device according to various embodiments.

FIG. 3 illustrates an example of the functional configuration of an electronic device according to various embodiments. This functional configuration may be included in the electronic device 101 shown in FIG. 1 or the electronic device 101 shown in FIG. 2.

Referring to FIG. 3, the electronic device 101 may include a processor 310 (e.g., processor 120), a memory 320 (e.g., memory 130), a communication interface 330 (e.g., communication module 190), a display 340 (e.g., display device 160), and a sensor module 350 (e.g., sensor module 176).

The processor 310 may control the overall operation of the electronic device 101. The processor 310 may be operably coupled to other components in the electronic device 101, such as the memory 320, the communication interface 330, the display 340, and the like, in order to control the overall operation of the electronic device 101.

In various embodiments, the processor 310 may include one processor core or a plurality of processor cores. For example, the processor 310 may include a multi-core such as a dual-core, a quad-core, a hexa-core, or the like. According to embodiments, the processor 310 may further include a cache memory located within or outside the processor 310.

The processor 310 may receive instructions from other components of the electronic device 101, may interpret the received instructions, and may perform calculations or process data according to the interpreted instructions.

The processor 310 may process data or signals caused within the electronic device 101. For example, the processor 310 may request instructions, data, or signals from the memory 320. The processor 310 may record (or store) or update instructions, data, or signals in the memory 320 to control the electronic device 101 or other components within the electronic device 101.

The processor 310 may interpret and process messages, data, instructions, or signals received from the memory 320, the communication interface 330, the display 340, and the like. The processor 310 may generate new messages, data, instructions, or signals based on the received messages, data, instructions, or signals. The processor 310 may provide the processed or generated messages, data, instructions, or signals to the memory 320, the communication interface 330, the display 340, and the like.

The processor 310 may include at least one processor. For example, the processor 310 may include one or more of an application processor for controlling an upper layer program such as an application, a communication processor for controlling functions associated with communication, an audio codec for controlling encoding or decoding associated with audio signals, and a graphical processing unit (GPU).

In various embodiments, the processor 310 may perform a graphics pipeline or a rendering pipeline for representing a three-dimensional (3D) image as a two-dimensional (2D) raster image. For example, the processor 310 may perform 3D graphic rendering on an application (e.g., VR player) for providing a 3D image, using an application programming interface (API) such as OpenGL, OpenGLES, Direct3D, or the like. The processor 310 may convert a 3D image into a 2D image using the GPU (not shown) included in the electronic device 101 and may output the converted 2D image to the display 340.

The memory 320 may store instructions, control instruction codes, control information, or user data for controlling the electronic device 101. For example, the memory 320 may include an application, an operating system (OS), middleware, and a device driver.

The memory 320 may include one or more of a volatile memory (e.g., volatile memory 132) and a non-volatile memory (e.g., non-volatile memory 134). The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), and the like. The non-volatile memory may include a read only memory (ROM), a programmable ROM (PROM), an electrically programmable ROM (EPROM), an electrically erasable ROM (EEPROM), a flash memory, and the like.

The memory 320 may include a non-volatile medium such as a hard disk driver (HDD), a solid state disk (SSD), an embedded multimedia card (eMMC), a universal flash storage (UFS), or the like.

The memory 320 may include an application (e.g., a VR player) that provides a 3D image and a 3D graphics rendering module (e.g., APIs and instructions such as OpenGL, OpenGLES, Direct3D, etc.). The memory 320 (e.g., application and 3D graphics rendering module) may further include 3D modeling data.

The communication interface 330 may be utilized to generate or establish a communication path between another electronic device and the electronic device 101 (e.g., a communication path between the electronic device 101 and the external electronic device 210). For example, the communication interface 330 may be a module for at least one of a Bluetooth communication scheme, a Bluetooth low energy (BLE) communication scheme, a Wi-Fi communication scheme, a cellular (cellular or mobile) communication scheme, and a wired communication scheme. The communication interface 330 may provide signals, information, data, or messages received from the other electronic device, to the processor 310. The communication interface 330 may transmit signals, information, data, or messages provided by the processor 310 to the other electronic device.

The display 340 may output contents, data, or signals. In various embodiments, the display 340 may display an image signal processed by the processor 310. For example, the display 340 may display a screen (e.g., a 3D graphics screen) for VR. As another example, the display 340 may display a capture or still image. As another example, the display 340 may display a moving image or a camera preview image. As another example, the display 340 may display a graphical user interface (GUI) so that a user can interact with the electronic device 101.

The display 340 may be configured with a liquid crystal display (LCD) or an organic light emitting diode (OLED).

The sensor module 350 may include a plurality of sensors for detecting the movement of the electronic device 101. For example, the sensor module 350 may include an acceleration sensor for detecting acceleration according to the movement of the electronic device 101 or a change in the acceleration, a gyro sensor for detecting a change in the orientation or rotation of the electronic device 101, and the like. The sensor module 350 may provide information for indicating the movement of the electronic device 101 to the processor 310. The information for indicating the movement may be utilized to change a field of view of a user displayed in the image for VR via the display 340. For example, the information for indicating the movement may be utilized to change the field of view of the user in the image for VR according to the movement of a portion (e.g., head) of the user's body that wears the electronic device 101.

In various embodiments, the processor 310 may display contents via the display 340. For example, the contents may be an omnidirectional image or an image for VR. For example, the processor 310 may render a 3D modeling world included in the memory 320 (e.g., application) as a 2D image using 3D graphics technology and may output the result on the display.

In various embodiments, the processor 310 may generate or establish a communication path between the electronic device 101 and the external electronic device 210 via the communication interface 330. In various embodiments, the communication path may be generated by a connection of the electronic device 101 to the external electronic device 210. For example, the processor 310 may request the external electronic device 210 to make a connection, based on determining to control at least one function of the electronic device 101 associated with VR via the external electronic device 210 in the electronic device 101. The electronic device 101 and the external electronic device 210 may generate or establish the communication path based on the request for the connection. In various embodiments, the communication path may be generated by a connection of the external electronic device 210 to the electronic device 101. For example, the external electronic device 210 may request the electronic device 101 to make a connection in response to turn-on of the power of the external electronic device 210. The electronic device 101 and the external electronic device 210 may generate or establish the communication path based on the request for the connection.

In various embodiments, the processor 310 may display a representation (e.g., a graphic object, etc.) of the external electronic device 210 overlaying the omnidirectional image, via the display 340. For example, the processor 310 may generate the omnidirectional image by adding or loading a 3D model object corresponding to the external electronic device 210 included in the memory 320 (e.g., middleware or virtual keyboard input module) to a 3D modeling world provided via an application. For example, the application may add and load the 3D model object corresponding to the external electronic device to the 3D modeling world provided via the application.

The representation of the external electronic device 210 may have a shape corresponding to the shape of the external electronic device 210 coupled to the electronic device 101. The representation of the external electronic device 210 may have the shape corresponding to the shape of the external electronic device 210 in order to provide enhanced user experience (UX) to a user having a limited field of view (FOV) due to watching the omnidirectional image. The representation of the external electronic device 210 may include a virtual touch pad corresponding to the touch pad of the external electronic device 210. The shape of the virtual touch pad may correspond to the shape of the touch pad of the external electronic device 210. The virtual touch pad may have a shape corresponding to the shape of the touch pad of the external electronic device 210 in order to provide extended UX to a user who performs a touch input through the touch pad of the external electronic device 210. The representation of the external electronic device 210 may include a virtual keyboard within the virtual touch pad. The virtual keyboard may be displayed within (or adjacent to) the virtual touch pad in order to provide enhanced UX to a user who inputs a character to at least a portion of the omnidirectional image via the touch pad of the external electronic device 210. For example, the processor 310 may add or load the virtual keyboard-shaped 3D model object (e.g., plain shape) to the 3D model object of the virtual touch pad, using at least one of an application and middleware. For example, the virtual keyboard-shaped 3D model object may be disposed adjacent to the virtual touch pad. For example, the virtual keyboard-shaped 3D model object disposed adjacent to the virtual touch pad may be a texture model having a specified offset and having a transparent value.

By way of another example, the processor 310 may replace or change a texture image applied to the 3D model object of the virtual touch pad, using an application or middleware. For example, the processor 310 may map a 3D texture having the virtual keyboard shape to at least a portion of the virtual touch pad, using an application or middleware. Based on the mapping, the processor 310 may display a 2D texture having the virtual keyboard shape, which is changed from the texture image previously applied to the at least a portion of the virtual touch pad, within the at least a portion of the virtual touch pad.

The virtual keyboard may provide a field of view associated with an input of a character to a user who inputs the character via the touch pad of the external electronic device 210. The character may be an object that a user inputs to at least a portion of the omnidirectional image. For example, the character may include a letter such as an alphabet, a number, or the like. For example, the character may include a symbol, such as a punctuation mark used to increase the readability of texts or to divide texts. For example, the character may include an emoticon for expressing user's emotions or abbreviated texts. The virtual keyboard may include a plurality of keys for indicating a plurality of characters.

In various embodiments, the processor 310 may display a representation of the external electronic device 210 superimposed on the omnidirectional image, in response to detecting a designated event while displaying the omnidirectional image. For example, the processor 310 may display a representation of the external electronic device 210 superimposed on the omnidirectional image, in response to detecting that a character input portion or a text input portion is activated within the omnidirectional image while displaying the omnidirectional image. By way of another example, the processor 310 may display a representation of the external electronic device 210 superimposed on the omnidirectional image, in response to detecting a user input to the character input portion displayed within the omnidirectional image while displaying the omnidirectional image. By way of another example, the processor 310 may display a representation of the external electronic device 210 superimposed on the omnidirectional image, in response to detecting that a designated or specified application is executed in the electronic device 101 while displaying the omnidirectional image. By way of another example, the processor 310 may receive information regarding the user input transmitted from the external electronic device 210 in response to detecting a user input to a physical button of the external electronic device 210 by the external electronic device 210 while displaying the omnidirectional image. The processor 310 may display a representation of the external electronic device 210 superimposed on the omnidirectional image based on the received information.

In various embodiments, the processor 310 may receive various information from the external electronic device 210 while displaying the representation of the external electronic device 210, via the communication interface 330.

For example, the processor 310 may receive, in response to detecting a first touch input to the touch pad by the external electronic device 210, information regarding the first touch input transmitted from the external electronic device 210 while displaying the representation of the external electronic device 210, via the communication interface 330. The first touch input may be an input configured to input the character to at least a portion of the omnidirectional image. For example, the first touch input may include one or more of a single tap input to a partial area of the touch pad of the external electronic device 210, a double tap input to a partial area of the touch pad of the external electronic device 210, a drag input to the touch pad of the external electronic device 210, a swipe input to the touch pad of the external electronic device 210, a force input to a partial area of the touch pad of the external electronic device 210, and a hovering input to a partial area of the touch pad of the external electronic device 210.

By way of another example, the processor 310 may receive, in response to detecting a second touch input to the touch pad by the external electronic device 210, information regarding the second touch input transmitted from the external electronic device 210 while displaying the representation of the external electronic device 210, via the communication interface 330. The second touch input may be an input configured to change or switch the virtual keyboard displayed within the representation of the external electronic device 210 to another virtual keyboard. For example, the second touch input may be an input configured to change the virtual keyboard for an input of a first language to the other virtual keyboard for an input of a second language, a symbol, or an emoticon. For example, the second touch input may include one or more of a single tap input to a partial area of the touch pad of the external electronic device 210, a double tap input to a partial area of the touch pad of the external electronic device 210, a drag input to the touch pad of the external electronic device 210, a swipe input to the touch pad of the external electronic device 210, a force input to a partial area of the touch pad of the external electronic device 210, and a hovering input to a partial area of the touch pad of the external electronic device 210.

According to embodiments, the second touch input may be replaced by an input to a physical button received via an input device (e.g., input device 450 of FIG. 4), such as the physical button of the external electronic device 210. In such a case, the processor 310 may receive information regarding the physical button while displaying the representation of the external electronic device 210, via the communication interface 330. The processor 310 may display the other virtual keyboard changed from the virtual keyboard on the basis of at least the information regarding the physical button.

By way of another example, the processor 310 may receive, in response to detecting a third touch input to the touch pad by the external electronic device 210, information regarding the third touch input transmitted from the external electronic device 210 while displaying the representation of the external electronic device 210, via the communication interface 330. The third touch input may be an input configured to move a cursor displayed within a character input portion of the omnidirectional image. The cursor may be displayed within the character input portion to indicate a location where the character is to be input. The third touch input may be an input configured to use a function corresponding to an arrow key used in the keyboard, a function corresponding to an enter key used in the keyboard, a function corresponding to a space bar used in the keyboard, a function corresponding to a backspace key used in the keyboard, or a function corresponding to a delete key used in the keyboard. The third touch input may include one or more of a single tap input to a partial area of the touch pad of the external electronic device 210, a double tap input to a partial area of the touch pad of the external electronic device 210, a drag input to the touch pad of the external electronic device 210, a swipe input to the touch pad of the external electronic device 210, a force input to a partial area of the touch pad of the external electronic device 210, and a hovering input to a partial area of the touch pad of the external electronic device 210.

By way of another example, the processor 310 may receive, in response to detecting a change in the movement of the external electronic device 210 by the external electronic device 210, information regarding the change in the movement transmitted from the external electronic device 210, via the communication interface 330. The change in the movement of the external electronic device 210 may indicate one or more of a change in the physical location of the external electronic device 210, a change in the orientation of the external electronic device 210, and a change in the movement speed of the external electronic device 210. The processor 310 may receive the information regarding the change in the movement in order to provide enhanced UX by moving the representation of the external electronic device 210 according to the movement of the external electronic device 210.

The various information may be periodically or aperiodically received from the external electronic device 210. For example, the various information may be received from the external electronic device 210 at a specified time interval, and may be received subject to the occurrence of a specific event at the external electronic device 210.

In various embodiments, the processor 310 may process the received information.

For example, the processor 310 may process the information regarding the first touch input. The processor 310 may identify a key corresponding to the first touch input among a plurality of keys, which is included in the virtual keyboard and indicates the plurality of characters, based on the reception of the information regarding the first touch input (e.g., touch down/up event and/or coordinate information {e.g., (x, y) coordinates indicating a location at which the first touch input is detected}. The information regarding the first touch input may include data (e.g., coordinate data, etc.) on the location at which the first touch input is detected within the external electronic device 210. The processor 310 may identify a key disposed at a location corresponding to the location at which the first touch input is detected among the plurality of keys as a key corresponding to the first touch input, based on the data regarding the location. The processor 310 may inquire or retrieve mapping information stored in the memory 320 using the data regarding the location. The mapping information may include data regarding a relationship between the location at which the first touch input is detected from the touch pad of the external electronic device 210 and each location of the plurality of keys included in the virtual keyboard. The processor 310 may determine, from the mapping information, a location within the virtual keyboard associated with the location included in the information regarding the first touch input. The processor 310 may identify the key corresponding to the determined location among the plurality of keys as the key corresponding to the first touch input and may generate a key event corresponding to the identified key and data regarding the key. For example, the processor 310 may generate an event that corresponds to the first touch input and indicates that the key is pressed (or released) and data regarding a key code value indicating the identified key. The processor 310 may provide the generated event and data to a VR object within the omnidirectional image displayed to have a focus on a VR environment or an application (or program) corresponding to the VR object. In other words, the processor 310 may provide the generated event and data to a suitable program module for inputting the character.

The processor 310 may display a character indicated by the identified key, on the at least a portion of the omnidirectional image, via the display 340.

By way of another example, the processor 310 may process information regarding the second touch input. The processor 310 may change the displayed virtual keyboard to another virtual keyboard, based on the reception of the information regarding the second touch input (or information regarding the physical button of the external electronic device 210). For example, when the second touch input corresponds to a drag input in a first direction or a second direction, the processor 310 may identify whether the second touch input corresponds to the drag input in the first direction or the drag input in the second direction, based on the information regarding the second touch input. The processor 310 may change or switch a first virtual keyboard for an input of a first language to a second virtual keyboard for an input of a second language, based on identifying that the second touch input corresponds to the drag input in the first direction. The processor 310 may change or switch the first virtual keyboard for the input of the first language to a third virtual keyboard for an input of a symbol, based on identifying that the second touch input corresponds to the drag input in the second direction. By way of another example, when the second touch input corresponds to a multi-tap input, the processor 310 may identify the number of taps of the second touch input based on the information regarding the second touch input. The processor 310 may change or switch the first virtual keyboard for the input of the first language to the second virtual keyboard for the input of the second language subsequent to the first virtual keyboard, based on identifying that the number of taps is n. The processor 310 may change or switch the first virtual keyboard for the input of the first language to the third virtual keyboard for the input of the symbol subsequent to the second virtual keyboard, based on identifying that the number of taps is "n+k."

By way of another example, the processor 310 may process information regarding the third touch input. The processor 310 may move a cursor displayed within the character input portion of the omnidirectional image, based on the reception of the information regarding the third touch input. For example, when the third touch input corresponds to a drag input in a third direction or a fourth direction, the processor 310 may identify whether the third touch input corresponds to a drag input in the third direction or a drag input in the fourth direction, based on the information regarding the third touch input. The processor 310 may move the location of the cursor to a location after an n-th space from a currently displayed location, based on identifying that the third touch input corresponds to the drag input in the third direction. The processor 310 may move the location of the cursor to a location prior to the n-th space from the currently displayed location, based on identifying that the third touch input corresponds to the drag input in the fourth direction. According to embodiments, the information regarding the third touch input may further include information regarding a drag length of the drag input. In this case, the processor 310 may move the cursor by a length corresponding to the drag length. By way of another example, when the third touch input includes a long press input and drag input, the processor 310 may analyze the information regarding the third touch input. The processor 310 may determine that the third touch input relates to the movement of the cursor, based on identifying that the third touch input includes the long press input. The processor 310 may move the cursor in a direction corresponding to the drag input, based on identifying that the third touch input includes the drag input.

By way of another example, the processor 310 may process information regarding a change in the movement of the external electronic device 210. The processor 310 may change the state of the displayed representation of the external electronic device 210, based on the reception of the information regarding the change in the movement. For example, when the change in the movement is a change in the orientation of the external electronic device 210, the information regarding the change in the movement may include data regarding a degree at which the orientation of the external electronic device 210 is changed. The processor 310 may change the orientation of the representation of the external electronic device 210 by an orientation corresponding to the changed degree. When it is determined or estimated that at least a portion of the virtual keyboard is directed outside of a field of view of a user according to the change in the orientation of the representation, the processor 310 may configure the orientation of the virtual keyboard to be different from the orientation of the representation so that the virtual keyboard is directed outside of the field of view of the user. When it is determined that the at least a portion of the virtual keyboard is directed outside of the field of view of the user according to the change in the orientation of the representation, the processor 310 may display the virtual keyboard displayed within the virtual touch pad included in the representation, on another area distinct from the virtual touch pad so that the virtual keyboard is directed to the field of view of the user. By way of another example, when the change in the movement is a change in the location of the external electronic device 210, the information regarding the change in the movement may include data regarding a distance at which the external electronic device 210 is moved and data regarding a direction in which the external electronic device 210 is moved. The processor 310 may determine the location of the external electronic device 210 to be a location corresponding to the distance at which the external electronic device 210 is moved and the direction in which the external electronic device 210 is moved. When it is determined that the location is outside of the FOV of the user, the processor 310 may move a location of the virtual keyboard or a location of the representation to another location distinct from the determined location so that the virtual keyboard is included in the FOV of the user. When it is determined that the location is within the FOV of the user, the processor 310 may move the location of the virtual keyboard to the determined location.

The processor 310 according to various embodiments may provide various effects associated with the virtual keyboard.

For example, the processor 310 may provide a visual effect associated with the virtual keyboard within the electronic device 101. For example, when the information regarding the first touch input is received and the key corresponding to the first touch input is identified, the processor 310 may provide a visual effect indicating that the identified key is pressed by the first touch input. The visual effect may be caused within (or adjacent to) an area associated with the identified key. The visual effect may provide the user with extended UX. By way of another example, when the information regarding the second touch input is received, the processor 310 may provide a visual effect indicating that the virtual keyboard is switched to another virtual keyboard. The visual effect may provide the user with extended UX.

By way of another example, the processor 310 may provide an auditory effect associated with the virtual keyboard within the electronic device 101. For example, when the information regarding the first touch input is received and the key corresponding to the first touch input is identified, the processor 310 may output non-language sound indicating that the identified key is pressed by the first touch input or may output sound indicating a character indicated by the identified key. The auditory effect may provide the user with enhanced UX.

By way of another example, the processor 310 may provide a haptic effect associated with the virtual keyboard within the electronic device 101. For example, when the information regarding the first touch input is received and the key corresponding to the first touch input is identified, the processor 310 may output vibration or a haptic effect indicating that the identified key is pressed by the first touch input, through a haptic actuator in the electronic device 101. The haptic effect may provide the user with enhanced UX.

By way of another example, the processor 310 may provide the haptic effect associated with the virtual keyboard via the external electronic device 210. For example, when the information regarding the first touch input is received and the key corresponding to the first touch input is identified, the processor 310 may transmit a message indicating that the identified key is pressed by the first touch input to the external electronic device 210. The external electronic device 210 may output vibration or haptic in an area where the first touch input is detected, in response to the reception of the message. The haptic effect may provide the user with enhanced UX.

As described above, the electronic device 101 according to various embodiments may display the virtual keyboard within the virtual touch pad corresponding to the touch pad of the external electronic device 210 included in the representation of the external electronic device 210 coupled to the electronic device 101, via the display of the electronic device 101, and may provide an intuitive character input service by inputting a character via the virtual keyboard based on an input to the touch pad of the external electronic device 210.

Figure 4:
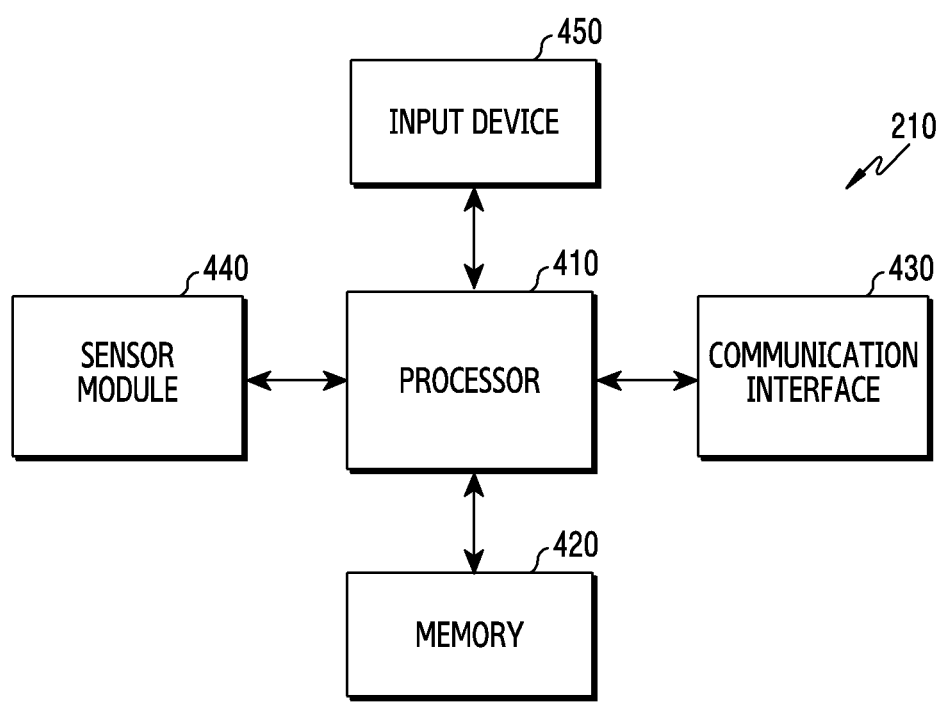
FIG. 4 illustrates an example of the functional configuration of an external electronic device according to various embodiments.

FIG. 4 illustrates an example of the functional configuration of an external electronic device according to various embodiments. This functional configuration may be included in the external electronic device 210 shown in FIG. 2.

Referring to FIG. 4, the external electronic device 210 may include a processor 410, a memory 420, a communication interface 430, a sensor module 440, and an input device 450.

The processor 410 may control the overall operation of the external electronic device 210. The processor 410 may be operably coupled to other components in the external electronic device 210, such as the memory 420, the communication interface 430, or the like, in order to control the overall operation of the external electronic device 210.

In various embodiments, the processor 410 may include one processor core or a plurality of processor cores. For example, the processor 310 may include a multi-core such as a dual-core, a quad-core, a hexa-core, or the like. According to embodiments, the processor 410 may further include a cache memory located within or outside the processor 410.

The processor 410 may receive instructions of other components of the external electronic device 210, may interpret the received instructions, and may perform calculation or process data according to the interpreted instructions.

The processor 410 may process data or signals caused within the external electronic device 210. For example, processor 410 may request instructions, data, or signals from the memory 420. The processor 410 may record (or store) or update instructions, data, or signals within the memory 420 in order to control the external electronic device 210 or other components within the external electronic device 210.

The processor 410 may interpret or process messages, data, instructions, or signals received from the memory 420, the communication interface 430, and the like. The processor 410 may generate new messages, data, instructions, or signals based on the received messages, data, instructions, or signals. The processor 410 may provide the processed or generated messages, data, instructions, or signals to the memory 420, the communication interface 430, and the like.

The memory 420 may store instructions, control instruction codes, control information, or user data for controlling the external electronic device 201. For example, the memory 420 may include an application, an OS, middleware, and a device driver.

The memory 420 may include one or more of a volatile memory and a non-volatile memory. The volatile memory may include a DRAM, an SRAM, an SDRAM, a PRAM, an MRAM, an RRAM, a FeRAM, and the like. The non-volatile memory may include a ROM, a PROM, an EPROM, an EEPROM, a flash memory, and the like.

The memory 420 may include a non-volatile medium such as an HDD, an SSD, an eMMC, a UFS, or the like.

The communication interface 430 may be utilized to generate or establish a communication path between another electronic device and the external electronic device 201 (e.g., a communication path between the electronic device 101 and the external electronic device 210). For example, the communication interface 330 may be a module for at least one of a Bluetooth communication scheme, a BLE communication scheme, a Wi-Fi communication scheme, a cellular (cellular or mobile) communication scheme, and a wired communication scheme. The communication interface 430 may provide signals, information, data, or messages received from the other electronic device, to the processor 410. The communication interface 430 may transmit signals, information, data, or messages provided by the processor 410 to the other electronic device.

The sensor module 440 may be utilized to detect a state associated with the external electronic device 210. In various embodiments, the sensor module 440 may provide information regarding a touch input detected through a touch pad exposed through a portion of the housing of the external electronic device 210, to the processor 410. In various embodiments, the sensor module 440 may provide information indicating that a user detected through a gyro sensor disposed inside the housing of the external electronic device 210 grips the external electronic device 210, to the processor 410. In various embodiments, the sensor module 440 may provide information regarding a change in the orientation of the external electronic device 210 detected through the gyro sensor, to the processor 410. In various embodiments, the sensor module 440 may provide information regarding a change in the location of the external electronic device 210 or a change in the movement speed of the external electronic device 210, which is detected through the gyro sensor disposed inside the housing of the external electronic device 210, to the processor 410.

The input device 450 may be used for interaction with a user. For example, the input device 450 may be constituted of a touch pad exposed through a portion of the housing of the external electronic device 210, a physical button exposed through another portion of the housing of the external electronic device 210, or the like. The input device 450 may provide information regarding an input received from a user, to the processor 410.

In various embodiments, the processor 410 may detect a touch input received through the touch pad of the external electronic device 210. The processor 410 may transmit information regarding the touch input to the electronic device 101 through the communication interface 430 in response to the detection. The information regarding the touch input may be transmitted to update the state of the virtual keyboard displayed within the electronic device 101.

In various embodiments, the processor 410 may detect a user input received through the physical button of the external electronic device 210. The processor 410 may transmit information regarding the user input to the electronic device 101 through the communication interface 430, in response to the detection. The information regarding the user input may be transmitted to update the state of the virtual keyboard within the electronic device 101.

In various embodiments, the processor 410 may detect a change in the movement of the external electronic device 210 through the gyro sensor or acceleration sensor of the external electronic device 210. The processor 410 may transmit information regarding the change in the movement through the communication interface 430, in response to the detection. The information regarding the change in the movement may be transmitted to update the state of the representation of the external electronic device displayed within the electronic device 101.

As described above, the external electronic device 210 according to various embodiments may provide information associated with the external electronic device 210 to the electronic device 101. Through the provision of this information, a user associated with the electronic device 101 and the external electronic device 201 may more intuitively input the character to the image for VR.

Figure 5A:
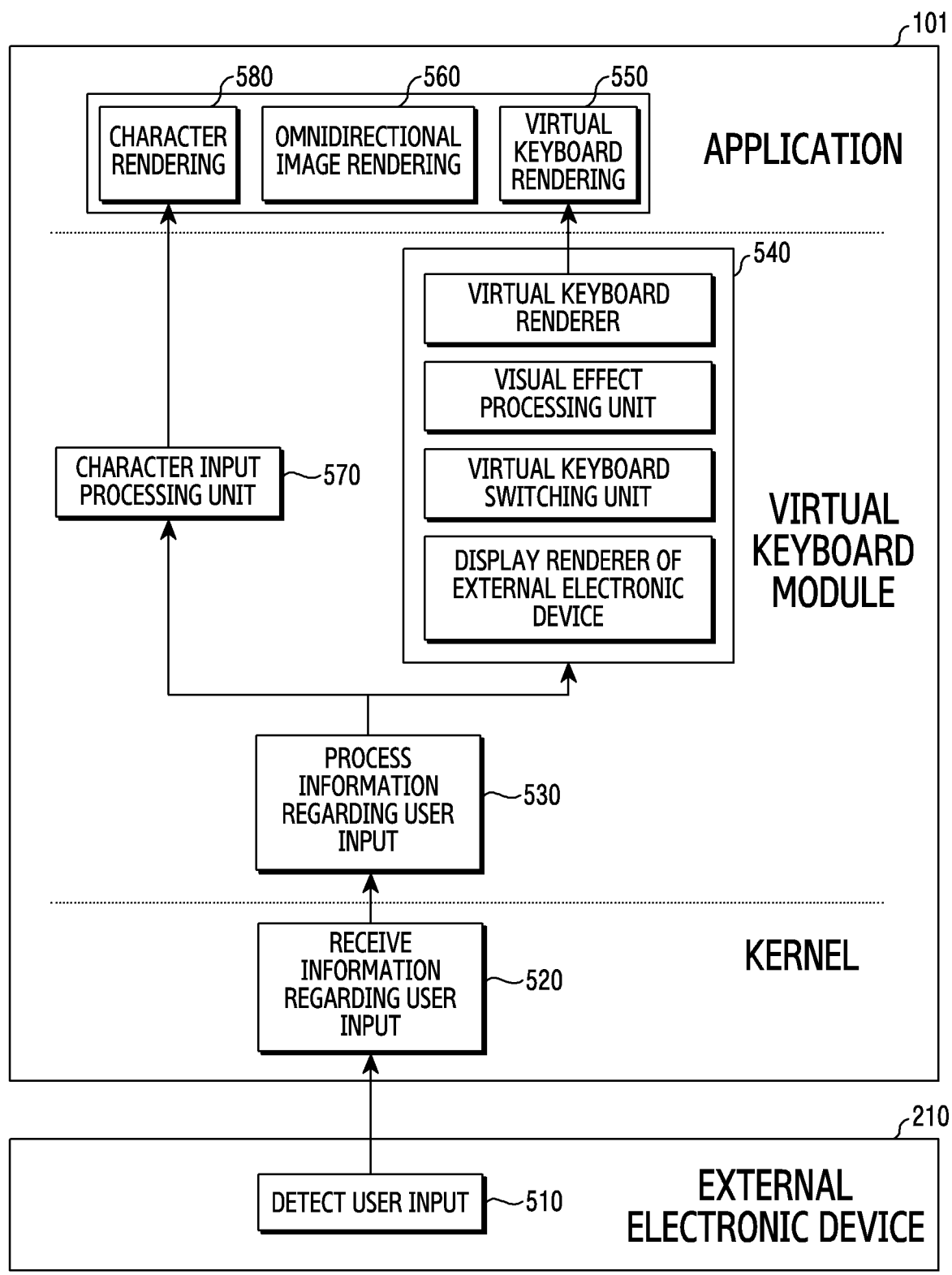
FIG. 5A illustrates an example of association between an electronic device displaying a virtual keyboard and an external electronic device according to various embodiments.

FIG. 5A illustrates an example of association between an electronic device displaying a virtual keyboard and an external electronic device according to various embodiments. This association may be caused by the electronic device 101 shown in FIG. 3 and the external electronic device 210 shown in FIG. 4.

Referring to FIG. 5A, in operation 510, the external electronic device 210 may detect a user input. The user input may include one or more of a touch input to the touch pad of the external electronic device 210, a change in the movement of the external electronic device 210 according to a gesture of a user gripping the external electronic device 210, and an input to the external electronic device 210 or to at least one input device of the external electronic device 210 distinct from the touch pad of the external electronic device 210. The external electronic device 210 may transmit information regarding the detected user input to the electronic device 101.

In operation 520, the electronic device 101 may receive the information regarding the user input from the external electronic device 210. The electronic device 101 may receive the information regarding the user input, using an OS such as a kernel stored in the memory 320. The OS such as the kernel may be stored in advance in the memory 320. The electronic device 101 (e.g., the OS) may provide the information regarding the user input to a virtual keyboard input module in the middleware included in the memory 320 of the electronic device 101.

In operation 530, the electronic device 101 may process the information regarding the user input, using the virtual keyboard input module. The virtual keyboard input module may be activated as needed. For example, the virtual keyboard input module may be loaded into a program as needed. The virtual keyboard input module may include modeling data of the representation of the external electronic device 210 corresponding to the external electronic device 210 coupled to the electronic device 101. For example, the virtual keyboard input module may rotate or move the representation of the external electronic device 210 using an application for VR on the basis of at least information received from the external electronic device 210 coupled to the electronic device 101 or the information regarding the user input provided from the OS included in the electronic device 101. By way of another example, the virtual keyboard input module may analyze the information regarding the user input (e.g., a user input to the touch pad of the external electronic device 210 or a user input to the physical key of the external electronic device 210), which is received from the external electronic device 210 coupled to the electronic device 101 and is provided from the OS included in the electronic device 101, may change the information regarding the user input to suitable event information based on the analysis result (e.g., change a touch event and touch coordinates for the touch pad of the external electronic device 210 to a key event and key value (or a key code) of the virtual keyboard), and may provide the event information to the application for VR and/or another application (not shown). The application for VR may be stored in the memory 320 in an installation operation. The application for VR may be stored in the memory 320 through an update. The electronic device 101 may process the information regarding the user input using the virtual keyboard input module stored in the memory 320.

For example, the electronic device 101 may interpret the information received from the external electronic device 210 using the virtual keyboard input module. The electronic device 101 may provide the interpreted information to a module (or virtual VR controller module) for the external electronic device 210 including a character input processing unit 570 or a virtual keyboard renderer, a visual effect processing unit, and a virtual keyboard switching unit of the virtual keyboard input module, and a representation renderer of the external electronic device 210. For example, the electronic device 101 may use the virtual keyboard input module to identify which key in the virtual keyboard corresponds to the touch coordinates input to the touch pad of the external electronic device 210. For example, when a central area (e.g., x=100, y=100) of the touch pad of the external electronic device 210 is touched by a user, the electronic device 101 may determine that at least one key (e.g., keycode='m', 'n', or 'o') corresponding to the central area of the touch pad of the external electronic device 210 among the plurality of keys in the virtual keyboard is input by a user. The electronic device 101 may provide data regarding the determination to the module for the character input processing unit 570 in the virtual keyboard module and the module for the external electronic device 210. By way of another example, the electronic device 101 may use the virtual keyboard input module to recognize the type of a user input (e.g., tap input, swipe input, or the like) to the touch pad of the external electronic device 210. The electronic device 101 may generate an event associated with a tap input, an event associated with a swipe input, etc., in the electronic device 101, on the basis of at least the recognition. In various embodiments, the recognition of the type of the user input to the touch pad of the external electronic device 210 may be performed even in operation 520. By way of another example, the electronic device 101 may use the virtual keyboard input module to determine what kind of movement corresponds to information regarding the movement of the external electronic device 210 detected through the sensor module 440 of the external electronic device 210, and may provide the determination result to the module (or the virtual VR controller module) for the external electronic device 210 including the virtual keyboard renderer, the visual effect processing unit, the virtual keyboard switching unit, and the representation renderer of the external electronic device 210.

In various embodiments, the electronic device 101 may identify the type of the user input. For example, when the type of the user input is associated with an input of a character through the virtual keyboard, the electronic device 101 may perform the operation of character input processing unit 570. By way of another example, when the type of the user input is associated with one or more of the display of the virtual keyboard, the switching of the virtual keyboard, the visual effect of the virtual keyboard, and the representation of the external electronic device 210, the electronic device 101 may perform operation 540.

In operation 540, the electronic device 101 may perform determination associated with one or more of the switching of the virtual keyboard, the visual effect associated with the virtual keyboard, and the representation of the external electronic device 210, based on the user input. For example, when the user input is associated with the display of the virtual keyboard, the electronic device 101 may determine whether to display the virtual keyboard within or adjacent to the representation of the external electronic device 210 using the virtual keyboard renderer of the virtual keyboard input module, based on the user input. When the user input is associated with the display of the virtual keyboard, the electronic device 101 may combine the representation of the external electronic device 210 with the virtual keyboard, using the virtual keyboard renderer of the virtual keyboard input module, so that the virtual keyboard and the representation of the external electronic device 210 can be recognized as one object. By way of another example, when the user input is associated with the visual effect associated with the virtual keyboard, the electronic device 101 may use the visual effect processing unit of the virtual keyboard module to determine to display the visual effect associated with the virtual keyboard, based on the user input. When the user input is associated with the visual effect associated with the virtual keyboard, the electronic device 101 may generate, in order to provide user experience such that a specific key of the virtual keyboard having a location corresponding to the touch input of the user is pressed, data for providing the visual effect (e.g., indicating the specific key or providing a lighting effect in the vicinity of the specific key) using the visual effect processing unit of the virtual keyboard input module. By way of example, when the user input is associated with the switching of the virtual keyboard, the electronic device 101 may determine to change the displayed virtual keyboard to another virtual keyboard using the virtual keyboard switching unit of the virtual keyboard module, based on the user input. When the user input is associated with the switching of the virtual keyboard, the electronic device 101 may generate data for changing the virtual keyboard to the other virtual keyboard indicated by the user input, using the virtual keyboard switching unit of the virtual keyboard module. By way of another example, when the user input is associated with the representation of the external electronic device 210, the electronic device 101 may determine to change the state of the representation of the external electronic device 210 using the representation renderer of the external electronic device 210 of the virtual keyboard module, based on the user input. When the user input is associated with the representation of the external electronic device 210, the electronic device 101 may generate, in order to provide user experience actually moving the external electronic device 210, data for providing a change in the location of the representation of the external electronic device 210 corresponding to information regarding the movement of the external electronic device 210 or providing rotation of the representation thereof, using the representation renderer of the external electronic device 210 of the virtual keyboard module.

In operation 550, the electronic device 101 may render the virtual keyboard through the display 340 using the application, in response to determining to display the virtual keyboard. For example, the electronic device 101 may render the virtual keyboard within the virtual touch pad corresponding to the touch pad of the external electronic device 210 included in the representation of the external electronic device 210, using the application through the display 340. The electronic device 101 may render the visual effect within an area associated with the virtual keyboard using the application through the display 340, in response to determining to display the visual effect associated with the virtual keyboard. For example, the electronic device 101 may render the visual effect in the vicinity of a specific key included in the virtual keyboard, using the application through the display 340. The electronic device 101 may render the other virtual keyboard using the application through the display 340, in response to determining to change the virtual keyboard to the other virtual keyboard. The electronic device 101 may render the representation (e.g., the rotation of the representation of the external electronic device 210 or the change in the location of the representation of the external electronic device 210) of the external electronic device 210 having the changed state, using the application through the display 340, in response to determining to change the state of the representation of the external electronic device 210.

In operation 560, the electronic device 101 may render an omnidirectional image. The electronic device 101 may render the omnidirectional image, based on the execution of the application, the change in the state of the electronic device 101, and the like. In various embodiments, the electronic device 101 may render a 3D modeling world through the application.

Operations 550, 560, and 580 may be simultaneously performed by the single application. For example, the application may generate a virtual screen for VR. The application may output the virtual screen through the display 340 by generating and rendering a 3D scene. In various embodiments, the application may output the virtual screen including the representation of the external electronic device 210 and the character by adding (or loading) modeling information (which may be previously stored in the memory) of the representation of the external electronic device 210 and character modeling information (which may be previously stored in the memory) to a VR virtual environment for the application using the virtual keyboard module.

Although not shown in FIG. 5A, the electronic device 101 may render a visual object in the omnidirectional image. The visual object may be rendered within the omnidirectional image through another application (another application of FIG. 5A) different from the application. When the electronic device 101 is not operated in a mode for VR or when the electronic device 101 is operated in a mode for non-VR, the other application may be utilized to configure a 2D screen using the view system of the framework of an OS and to output the 2D screen on the display 340 of the electronic device 101 or on an external display associated with the electronic device 101. Operation 560 may be performed independently of operations 510 to 550. Operation 560 may be performed irrespective of the order in which operations 510 to 550 are performed.

In the operation of character input processing unit 570, the electronic device 101 may perform determination associated with an input of the character, based on the user input. For example, the electronic device 101 may determine a character associated with the user input, using the character input processing unit of the virtual keyboard module. The electronic device 101 may store the determined character in a character arrangement (e.g., memory) using the character input processing unit of the virtual keyboard module. The electronic device 101 may inquire the mapping information stored in the memory 320 using the character input processing unit. The electronic device 101 may search for the inquired mapping information based on the coordinate information included in the information regarding the user input. Based on the search, the electronic device 101 may determine a character mapped to the coordinate information as a character intended by the user input.

In operation 580, the electronic device 101 may render the determined character through the display 340 using the application. The electronic device 101 may render the determined character through the display 340 using the application in response to the determination of the character.

As described above, the electronic device 101 according to various embodiments may perform operations associated with the virtual keyboard through an installable program, such as an OS, middleware, or an application. Since the performance of the operation through such a program can be applied to electronic devices released in the past, it can be highly scalable.

Figure 5B:
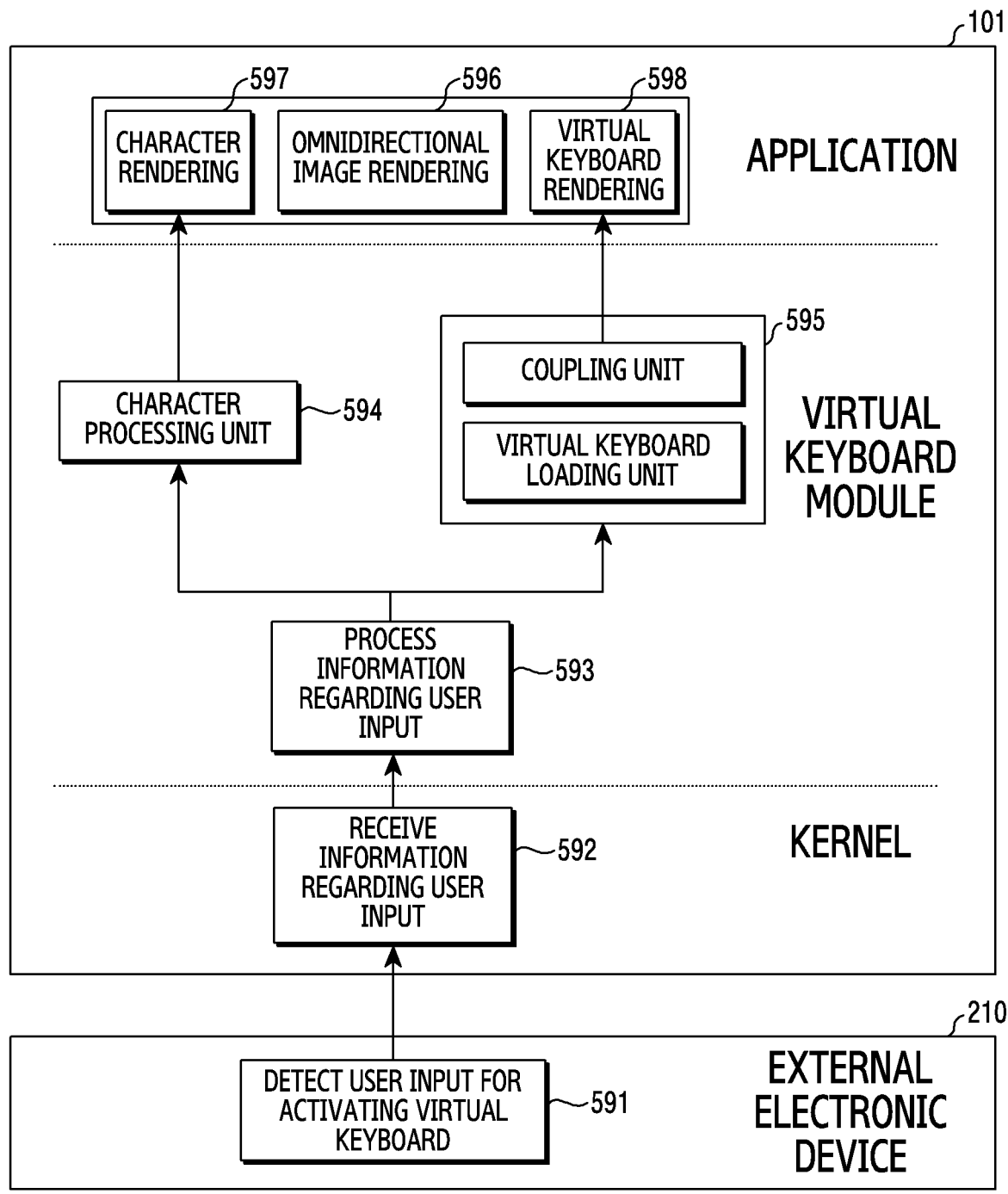
FIG. 5B illustrates another example of association between an electronic device displaying a virtual keyboard and an external electronic device according to various embodiments.

FIG. 5B illustrates another example of association between an electronic device displaying a virtual keyboard and an external electronic device according to various embodiments. This association can be caused by the electronic device 101 shown in FIG. 3 and the external electronic device 210 shown in FIG. 4.

Referring to FIG. 5B, in operation 591, the external electronic device 210 may detect a user input for activating the virtual keyboard. For example, the user input may be a touch input to the touch pad of the external electronic device 210. By way of another example, the user input may be an input to the physical button of the external electronic device 210. By way of another example, the user input may be a gesture of a user causing the movement of the external electronic device 210. By way of another example, the user input may be an input that combines one or more of the touch input, the input to the physical button, and the gesture of the user. The external electronic device 210 may transmit information regarding the user input for activating the virtual keyboard to the electronic device 101.

In operation 592, the electronic device 101 may receive the information regarding the user input from the external electronic device 210, using an OS such as the kernel stored in the memory 320. The electronic device 101 may provide the information regarding the user input to the virtual keyboard module included in the middleware stored in the memory 320, using the OS.

In operation 593, the electronic device 101 may process the information regarding the user input. For example, when the user input is the touch input, the electronic device 101 may acquire a key code (or key value) corresponding to the touch input based on coordinate information indicating a location at which the touch input included in the information regarding the user input is detected, using the virtual keyboard module. By way of another example, when the user input is the input to the physical button, the electronic device 101 may acquire data corresponding to the physical button based on the information regarding the user input, based on the virtual keyboard module. The electronic device may provide data regarding the acquired key code and/or the data corresponding to the physical button to one or more of the character processing unit within the virtual keyboard module and the virtual keyboard processing unit which is included in the virtual keyboard module and includes a coupling unit and a virtual loading unit.

In operation 594, the electronic device 101 may receive data regarding the acquired key code using the character processing unit. The electronic device 101 may determine a character corresponding to the key code based on mapping information including data a relationship between the key codes and the plurality of characters. The electronic device 101 may store the character corresponding to the key code in the character arrangement. The character stored in the character arrangement may be utilized to render the character. The electronic device 101 may provide information regarding the character to the application stored in the memory 320.

In operation 595, the electronic device 101 may generate information for rendering corresponding to the provided data, using the virtual keyboard processing unit. For example, the electronic device 101 may generate the information for rendering the virtual keyboard within a 3D space based on information regarding touch coordinates included in the provided data, a touch event, a physical button event, a key value of the virtual keyboard, a location of the external electronic device 210, and rotation of the external electronic device 210, using the keyboard processing unit. For example, the electronic device 101 may generate information for loading the virtual keyboard within the representation of the external electronic device 210 as the information for rendering the virtual keyboard, using the virtual keyboard loading unit included in the virtual keyboard processing unit. By way of another example, the electronic device 101 may generate information for combining the virtual keyboard and the representation of the external electronic device 210 as the information for rendering the virtual keyboard, using the coupling unit included in the virtual keyboard processing unit. The electronic device 101 may provide the information for rendering the virtual keyboard to the application stored in the memory 320.

In operation 596, the electronic device 101 may render the omnidirectional image or the image for VR through the display 340. The electronic device 101 may render the omnidirectional image using the application. In various embodiments, the electronic device 101 may render the 3D modeling world through the application.

Although not shown in FIG. 5B, the electronic device 101 may render a visual object in the omnidirectional image. The visual object may be rendered within the omnidirectional image through another application (another application of FIG. 5B) different from the application. When the electronic device 101 is not operated in a mode for VR (or when the electronic device 101 is operated in a mode for non-VR), the other application may be utilized to configure a 2D screen using the view system of the framework of the OS and to output the 2D screen on the display 340 of the electronic device 101 or an external display associated with the electronic device 101.

In operation 597, the electronic device 101 may render the character on the basis of at least the information regarding the character provided from the virtual keyboard module, using the application.

In operation 598, the electronic device 101 may render the virtual keyboard on the basis of at least the information for rendering the virtual keyboard provided from the virtual keyboard module, using the application. In other words, the electronic device 101 may activate the virtual keyboard in the omnidirectional image on the basis of at least the information provided from the virtual keyboard module, using the application.

Operations 596, 597, and 598 may be simultaneously performed through the single application. For example, the application may generate a virtual screen for VR. The application may output the virtual screen through the display 340 by generating and rendering a 3D screen. In various embodiments, the application may output the virtual screen including the representation of the external electronic device 210 and the character by adding (or loading) modeling information (which may be previously stored in the memory) of the representation of the external electronic device 210 and character modeling information (which may be previously stored in the memory) to a VR virtual environment for the application, using the keyboard module.

As described above, the electronic device 101 according to various embodiments may perform operations associated with the virtual keyboard through an installable program, such as an OS, middleware, or an application. Since the performance of the operation through such a program can be applied to electronic devices released in the past, it can be highly scalable or compatible.

As described above, the electronic device (e.g., electronic device 101) according to various embodiments may include a display (e.g., display 340), a communication module (e.g., communication interface 330), and a processor (e.g., processor 310). The processor may be configured to display contents through the display, to acquire data regarding the movement of the external electronic device including the touch sensor through the communication module, to move a graphic object corresponding to the shape of the external electronic device displayed over at least a portion of the contents through the display to correspond to the movement using the data, to display one or more virtual interfaces capable of executing one or more functions to correspond to an area displayed as the shape corresponding to the touch sensor of the external electronic device among the graphic objects through the display on the basis of at least an input, to acquire an input to the touch sensor and location information corresponding to the input to the touch sensor from the external electronic device through the communication module, to identify a virtual interface corresponding to the location information among the one or more virtual interfaces based on the input to the touch sensor, and to execute a function associated with the identified virtual interface among one or more designated functions.

In various embodiments, the one or more virtual interfaces may be usable to input text over at least a portion of the displayed contents.

In various embodiments, the processor may be configured to display text indicated by the identified virtual interface over the at least a portion of the contents as the execution of the function associated with the confirmed virtual interface.

In various embodiments, the processor may be configured to receive the information regarding the user input transmitted from the external electronic device through the communication module in response to detection of the user input to the touch sensor by the external electronic device, and to display the one or more virtual interfaces within an area displayed to have the shape corresponding to the touch sensor of the external electronic device among the graphic objects on the basis of at least the received information regarding the user input.

In various embodiments, the processor may be configured to display the one or more interfaces within the area displayed to have the shape corresponding to the touch sensor of the external electronic device among the graphic objects in response to detection of the display of an object for inputting text within the displayed contents.

In various embodiments, the processor may be configured to receive the information regarding the user input transmitted from the external electronic device through the communication module in response to detection of a user input to the physical button of the external electronic device by the external electronic device, and to display the one or more virtual interfaces within the area displayed to have the shape corresponding to the touch sensor of the external electronic device among the graphic objects on the basis of at least the received information regarding the user input.

The electronic device (e.g., electronic device 101) according to various embodiment described above may include a memory (e.g., memory 320) configured to store instructions, a display (e.g., display 340), a communication interface (e.g., communication interface 330), and a processor (e.g., processor 310) configured to be operably coupled to the memory, the display, and the communication interface. The processor may be configured to execute the stored instructions to display an omnidirectional image, to display a virtual keyboard including a plurality of keys indicating a plurality of characters within an area associated with a virtual touch pad corresponding to the touch pad of the external electronic device included in the representation of the external electronic device superimposed on the omnidirectional image, to receive information regarding the first touch input transmitted from the external electronic device in response to detection of the first touch input to the touch pad by the external electronic device, to identify a key corresponding to the first touch input among the plurality of keys based on the reception, and to display a character indicated by the identified key on at least a portion of the omnidirectional image.

In various embodiments, the processor may be further configured to execute the stored instructions to receive information regarding a second touch input transmitted from the external electronic device in response to detection of the second touch input to the touch pad by the external electronic device, and to display another virtual keyboard changed from the virtual keyboard including the plurality of keys based on reception of the second touch input. The other virtual keyboard may include a plurality of other keys indicating a plurality of other characters, the first touch input may correspond to at least one tap input to a partial area of the touch pad, and the second touch input may correspond to a drag input in a first direction or a second direction concerning the touch pad.

In various embodiments, the processor may be further configured to execute the stored instructions to display a visual effect indicating that the identified key is pressed by the first touch input in an area associated with the identified key after the key is identified.

In various embodiments, the processor may be configured to execute the stored instructions to receive information regarding the first touch input including data regarding a location at which the first touch input is detected within the touch pad, from the external electronic device, and to identify the key corresponding to the first touch input among the plurality of keys using the data regarding the location based on the reception.

In various embodiments, the processor may be further configured to execute the stored instructions to receive information regarding a change in the movement transmitted from the external electronic device in response to detection of the change in the movement of the external electronic device by the external electronic device, and to move the representation of the external electronic device based on the change in the movement. In various embodiments, the processor may be configured to execute the stored instructions to determine a location to which the representation of the external electronic device is to be moved over the omnidirectional image based on the information regarding the change in the movement, to confirm whether the determined location is outside of a field of view (FOV) of a user for the omnidirectional image, to move the representation of the external electronic device to another location included in the FOV based on confirming that the determined location is outside of the FOV for the omnidirectional image, and to move the representation of the external electronic device to the location based on confirming that the determined location is within the FOV.

In various embodiments, the processor may be further configured to execute the stored instructions to display a cursor subsequent to the character within a text input portion included in the omnidirectional image, to receive the information regarding the second touch input transmitted from the external electronic device in response to detection of the second touch input to the touch pad by the external electronic device, and to move the location of the cursor based on the information regarding the second touch input. The first touch input may correspond to at least one tap input to a partial area of the touch pad, and the second touch input may correspond to a drag input in a first direction or a second direction for the touch pad.

In various embodiments, the processor may be configured to execute the stored instructions to display the virtual keyboard within the virtual touch pad included in the representation superimposed on the omnidirectional image in response to detection of a user input to the text input portion within the omnidirectional image while the omnidirectional image is displayed.

In various embodiments, the processor may be configured to execute the stored instructions to display the virtual keyboard within the virtual touch pad included in the representation superimposed on the omnidirectional image in response to confirming that an application designated within the electronic device is executed while the omnidirectional image is displayed.

In various embodiments, the processor may be configured to execute the stored instructions to receive the information regarding the user input transmitted from the external electronic device in response to detection of the user input to the physical button of the external electronic device by the external electronic device while the omnidirectional image is displayed, and to display the virtual keyboard within the virtual touch pad included in the representation superimposed on the omnidirectional image in response to reception of the information regarding the user input.

In various embodiments, the omnidirectional image may provide virtual reality.

In various embodiments, the electronic device may further include a housing configured to be mounted on a user's head.

In various embodiments, each of the plurality of characters may correspond to one or more of a letter, a symbol, and an emoticon.

A non-transitory computer-readable storage medium (e.g., memory 320) according to various embodiments may store one or more programs for executing to display an image for virtual reality; to display a virtual keyboard including a plurality of keys indicating a plurality of characters, within an area associated with a virtual touch pad included in a representation of an external electronic device that is superimposed on the image, the virtual touch pad corresponding to a touch pad of the external electronic device; to receive information regarding a first touch input, wherein the information regarding the first touch input is transmitted from the external electronic device in response to detecting the first touch input on the touch pad in the external electronic device; based on the reception, to identify, among the plurality of keys, a key corresponding to the first touch input; and to display a character indicated by the identified key on at least a portion of the image.

Figure 6:
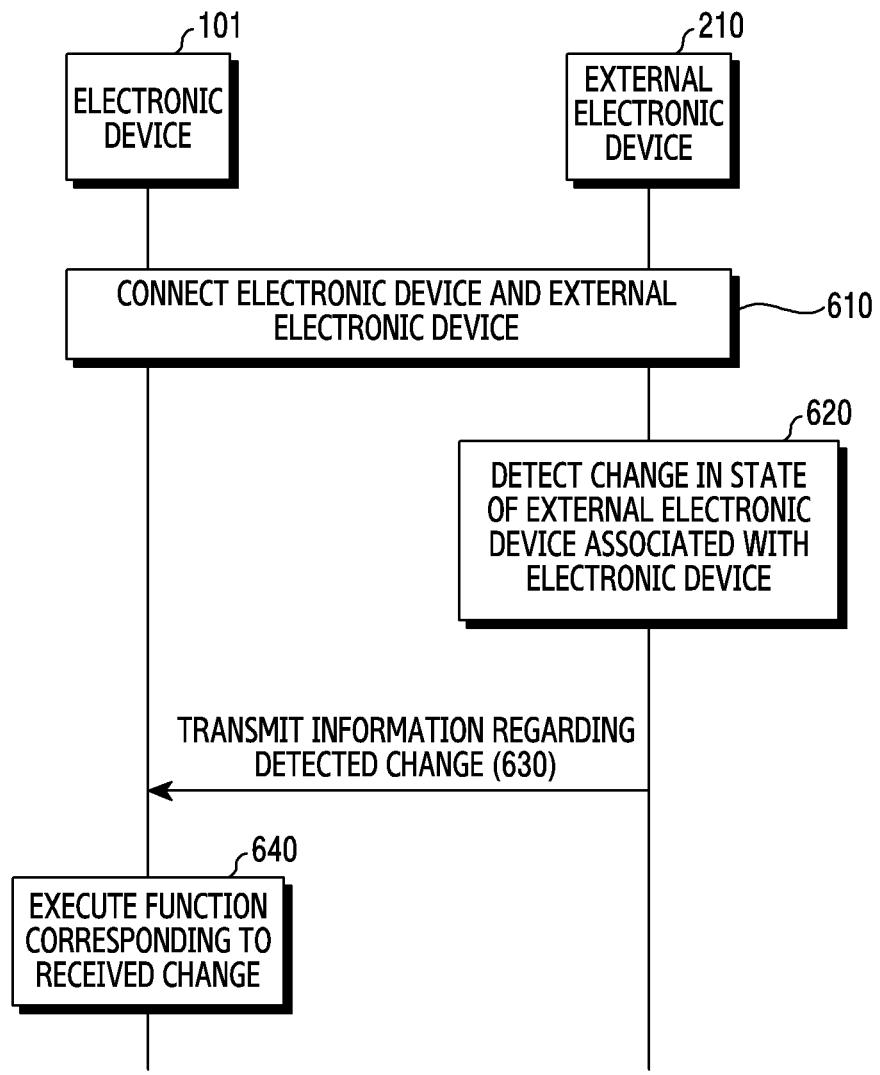
FIG. 6 illustrates an example of signaling between an electronic device and an external electronic device according to various embodiments.

FIG. 6 illustrates an example of signaling between an electronic device and an external electronic device according to various embodiments. This signaling can be caused between the electronic device 101 shown in FIG. 3 and the external electronic device 210 shown in FIG. 4.

Referring to FIG. 6, in operation 610, the electronic device 101 and the external electronic device 210 may generate a connection between the electronic device 101 and the external electronic device 210. For example, the electronic device 101 may request a connection to the external electronic device 210. The external electronic device 210 may receive the request of the electronic device 101. The electronic device 101 and the external electronic device 210 may generate the connection on the basis of at least the request and the reception of the request.

In operation 620, the external electronic device 210 may detect a change in the state of the external electronic device 210 associated with the electronic device 101 that is connected through the connection. For example, the detecting of the change in the state may include one or more of detecting a touch input to a touch pad of the external electronic device 210, detecting a user input to a physical button of the external electronic device 210, and detecting a change in the movement of the external electronic device 210.

In operation 630, the external electronic device 210 may transmit information regarding the change in the state of the external electronic device 210 to the electronic device 101 via the connection. In response to the detection, the external electronic device 210 may transmit the information regarding the state of the external electronic device 210 to the electronic device 101 via the connection. The external electronic device 210 may transmit the information regarding the change in the state of the external electronic device 210 to control the electronic device 101 based on the change in the state of the external electronic device 210. The electronic device 101 may receive the information regarding the change in the state of the external electronic device 210 from the external electronic device 210 via the connection.

In operation 640, the electronic device 101 may perform a function corresponding to the change. For example, when the information regarding the change in the state of the external electronic device 210 is associated with the touch input to the touch pad of the external electronic device 210, the electronic device 101 may input a character to the omnidirectional image displayed through the display 340 on the basis of at least the information regarding the change. By way of another example, when the information regarding the change in the state of the external electronic device 210 is associated with the user input to the physical button of the external electronic device 210, the electronic device 101 may initiate to display the virtual keyboard or initiate to display the representation of the external electronic device 210, on the basis of at least the information regarding the change. By way of another example, when the information regarding the change in the state of the external electronic device 210 is associated with the change in the movement of the external electronic device 210, the electronic device 101 may move the representation of the external electronic device 210 displayed through the display 340, on the basis of at least the information regarding the change.

As described above, the electronic device 101 according to various embodiments may use the input detected within the external electronic device 210 and the connection between the electronic device 101 and the external electronic device 210 to perform functions associated with VR or the external electronic device 210. Through the performance of these functions, the electronic device 101 may provide enhanced UX.

Figure 7:
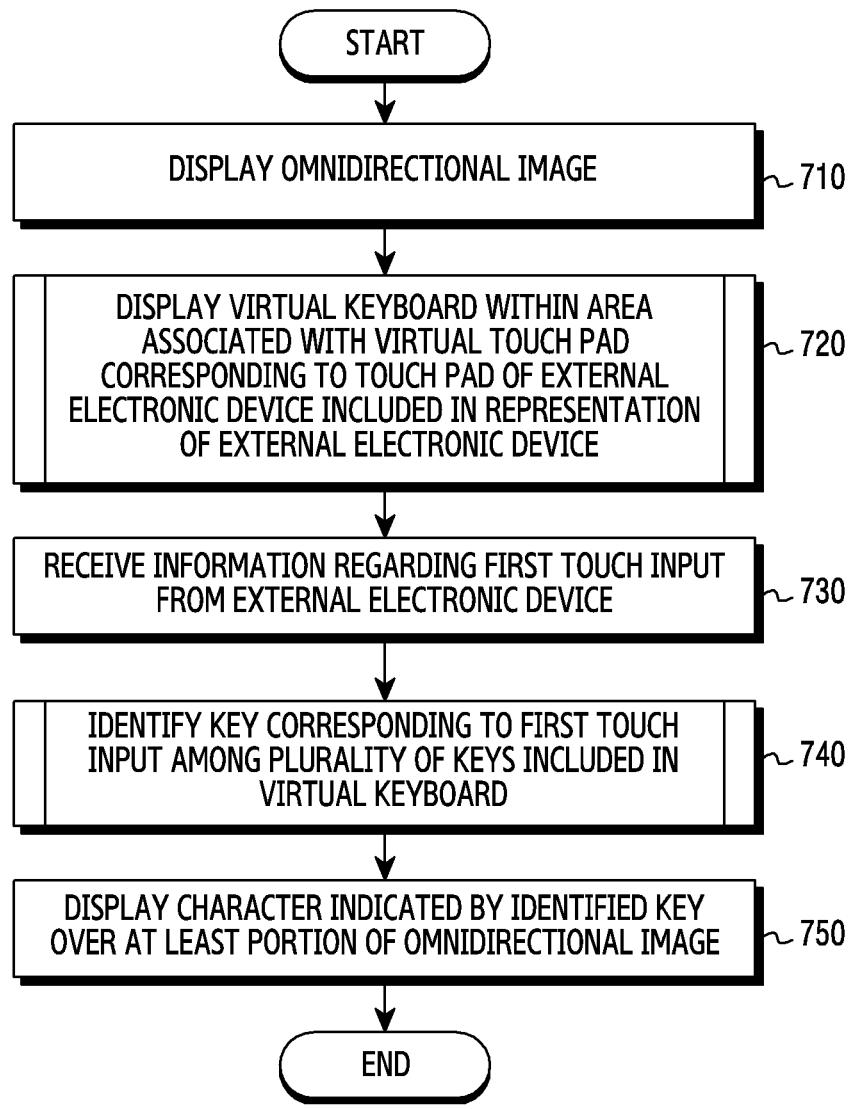
FIG. 7 illustrates an example of the operation of an electronic device according to various embodiments.

FIG. 7 illustrates an example of the operation of an electronic device according to various embodiments. This operation may be performed by the processor 310 within the electronic device 101 or the electronic device 101 shown in FIG. 3.

Figure 8:
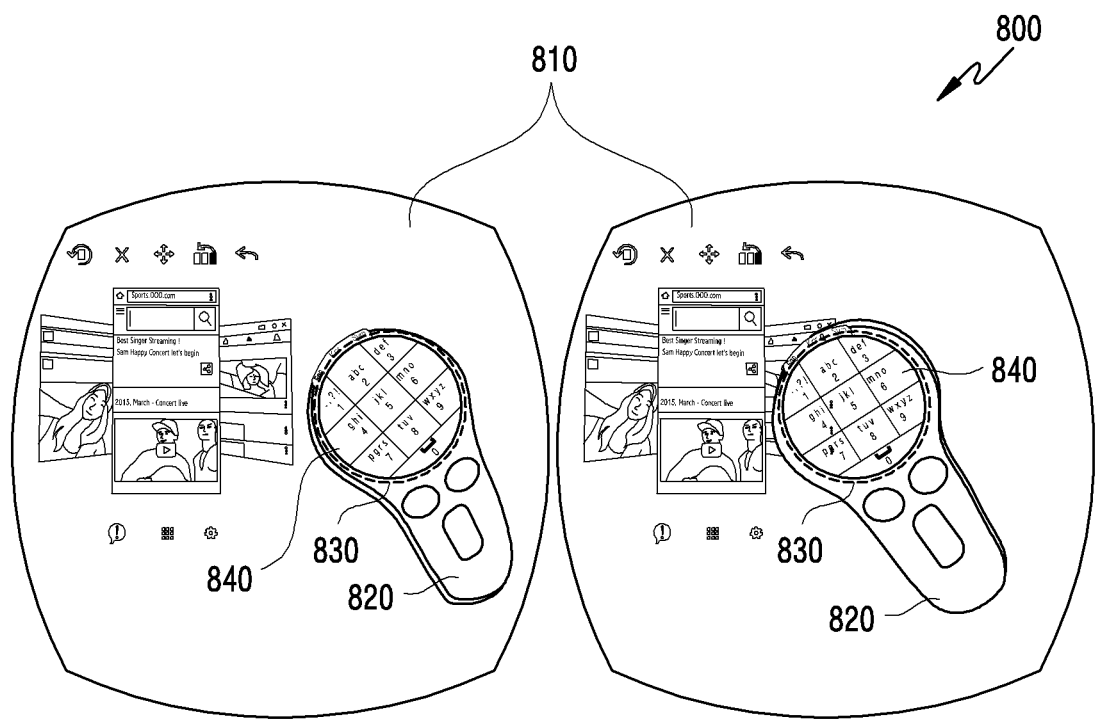
FIG. 8 illustrates an example of a screen displayed on a display of an electronic device according to various embodiments.

FIG. 8 illustrates an example of a screen displayed on a display of an electronic device according to various embodiments.

Figure 9:
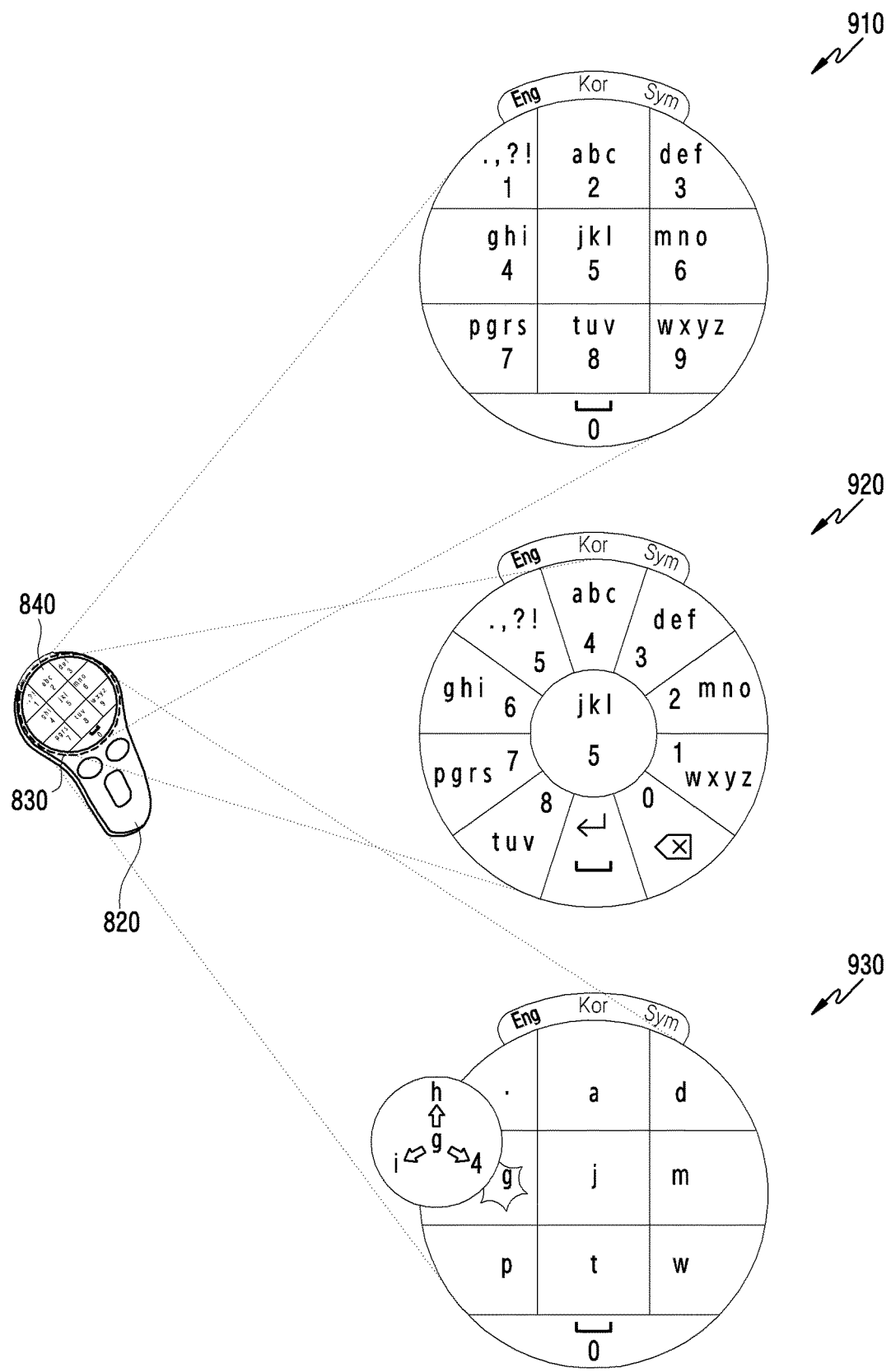
FIG. 9 illustrates an example of the shape of a virtual keyboard displayed on a display of an electronic device according to various embodiments.

FIG. 9 illustrates an example of the shape of a virtual keyboard displayed on a display of an electronic device according to various embodiments.

Figure 10:
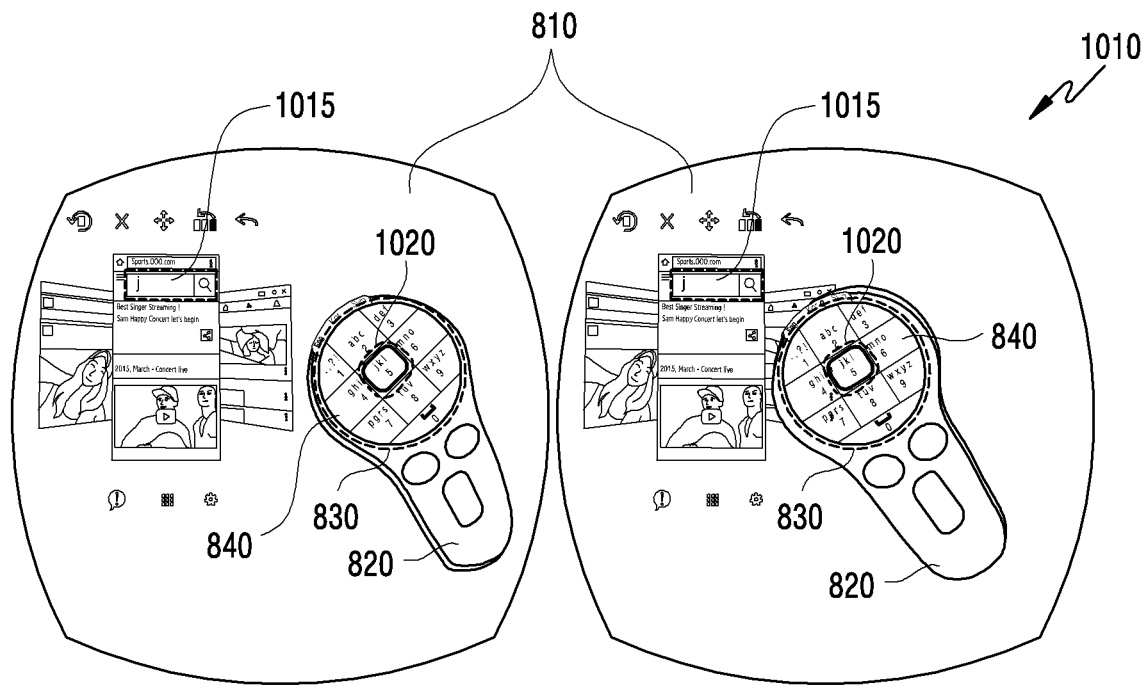
FIG. 10 illustrates an example of the operation associated with a virtual keyboard displayed on a display of an electronic device according to various embodiments.
Figure 10:
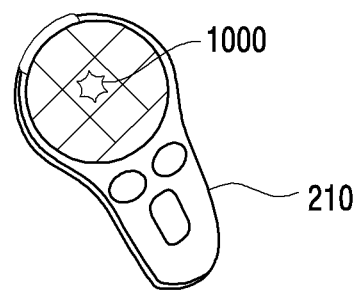

FIG. 10 illustrates an example of the operation associated with a virtual keyboard displayed on a display of an electronic device according to various embodiments.

Referring to FIG. 7, in operation 710, the processor 310 may display an omnidirectional image or a VR image through the display 340. In various embodiments, the processor 310 may display the omnidirectional image through the display 340 in response to detecting a user input for requesting generating and displaying of the omnidirectional image stored in the electronic device 101. In various embodiments, the processor 310 may display the omnidirectional image via the display 340 based on information received from another electronic device, such as a server or a camera device.

In operation 720, the processor 310 may display a virtual keyboard on or within a virtual touch pad. The virtual touch pad may correspond to the touch pad of the external electronic device 210 (e.g., a physical controller held by the user). The virtual touch pad is therefore virtually displayed as part of the VR representation of the external electronic device 210 displayed in the VR environment.

For example, the processor 310 (application and/or middleware) may add and/or load a 3D model object (e.g., a virtual object including a planar shape) having the virtual keyboard shape for disposition to a 3D model object of the virtual touch pad. The 3D model object having the virtual keyboard shape may be disposed adjacent to the virtual touch pad. For example, the 3D model object, including the virtual keyboard shape disposed adjacent to the virtual touch pad, may be a textured model having a specified offset and/or having a transparent value.

By way of another example, the processor 310 may replace or change a texture image applied to the 3D model object of the virtual touch pad, using an application or middleware. For example, the processor 310 may map a 3D texture having the virtual keyboard shape to at least a portion of the virtual touch pad, using an application or middleware. The processor 310 may display, within at least a partial area of the virtual touch pad, the 3D texture having the virtual keyboard shape changed from the texture image previously applied to the at least the partial area of the virtual touch pad, based on the mapping.

In various embodiments, the processor 310 may detect an event for displaying the representation of the external electronic device 210 while the omnidirectional image is displayed. For example, the event may include receiving an input indicating that the representation of the external electronic device 210 is to be displayed within the electronic device 101, receiving a message (e.g., message transmitted from the external electronic device 210 in response to detecting the input to the physical button of the external electronic device 210) requesting displaying of the representation of the external electronic device 210 from the external electronic device 210, and displaying a character input portion within the displayed omnidirectional image. The processor 310 may display the representation of the external electronic device 210 in response to the detection of the event. The representation of the external electronic device 210 may be superimposed on the displayed omnidirectional image. For example, referring to FIG. 8, the processor 310 may display an omnidirectional image 810 including a visual object within a screen 800. For example, the omnidirectional image 810 may include images generated (rendered) with different view positions or in different view directions to correspond to both the right eye and the left eye. For example, the omnidirectional image 810 disposed on the right side among the omnidirectional images 810 may be provided for the view position or view direction of the user's right eye, and the omnidirectional image 810 disposed on the left side among the omnidirectional images 810 may be provided for the view position of the user's left eye. In various embodiments, the visual object may be displayed based on another application distinct from the application providing the omnidirectional image. According to various embodiments, the other application may be utilized to provide service and application functions of a 2D environment within the omnidirectional image provided by the application for VR. The other application may configure a 2D screen (or visual object) within the framework of the OS stored in the memory 320. The electronic device may include (in a manner to be executed or mirrored) the 2D screen constituted by the other application as a 3D object within the omnidirectional image.

In other words, the application for providing the omnidirectional image may include functions of an Internet browser, a text editor, etc., to provide a window shape within a VR environment. For example, the application may include and render the screen of the other application (e.g., window for the Internet browser or the text editor) in the 3D screen such as the omnidirectional image.

The processor 310 may display a representation 820 of the external electronic device 210 superimposed on the omnidirectional image 810 in response to the detection of the event. The representation 820 of the external electronic device 210 may include a virtual touch pad 830 corresponding to the touch pad of the external electronic device 210. The virtual touch pad 830 may include a virtual keyboard 840. The virtual keyboard 840 may be displayed within (or in an area adjacent to) the virtual touch pad 830 included in the representation 820 of the external electronic device 210 in order to assist a FOV of a user having restrictions due to viewing of the omnidirectional image 810. The virtual keyboard 840 may include a plurality of keys for indicating a plurality of characters. The virtual keyboard 840 may have various shapes. For example, referring to FIG. 9, the virtual keyboard 840 included in the virtual touch pad 830 included in the representation of the external electronic device 210 may be configured, as in an object 910. The virtual keyboard 840 may include the plurality of keys disposed in an arrangement of keys of a feature phone keyboard, that is, in a grid type arrangement (3*4, 4*4, or the like), as in the object 910. Each of the plurality of keys may be utilized to represent the plurality of characters. Each of the plurality of keys may be also referred to as an executable object. By way of another example, referring to FIG. 9, the virtual keyboard 840 included in the virtual touch pad 830, which in turn is included in the representation 820 of the external electronic device 210, may be configured as in an object 920. The virtual keyboard 840 may include a plurality of keys disposed in an arrangement of keys of a radial keyboard, as in the object 920. Each of the plurality of keys may be utilized to represent the plurality of characters. By way of another example, referring to FIG. 9, the virtual keyboard 840 may be configured as in an object 930. The virtual keyboard 840 may include a plurality of keys disposed in an arrangement of keys of a grid type keyboard (e.g., feature phone keyboard), as in the object 930. Each of the plurality of keys may be utilized to represent the plurality of characters. A method in which each of the plurality of keys included in the object 930 selects a character through an input may be different from a method in which each of the plurality of keys included in the object 910 selects a character through an input and a method in which each of the plurality of keys included in the object 920 selects a character through an input. For example, when the virtual keyboard 840 has the same formats of the object 910 and the object 920, the processor 310 may identify that the touch input is a single tap input in response to reception of information regarding the touch input from the external electronic device 210, may select a first character (e.g., 'g') among a plurality of characters (e.g., 'g', 'h', 'i', and '6') indicated by each of the plurality of keys based on the identification, may identify that another touch input is a double tap input in response to reception of information regarding the other touch input from the external electronic device 210, and may select a second character (e.g., 'h') among the plurality of characters (e.g., 'g', 'h', 'i', and '6') based on the identification. When the virtual keyboard 840 has the same format of the object 930, the processor 310 may display a plurality of keys (e.g., 'g', 'h', 'i', and '4') derived from a key (e.g., 'g') corresponding to a location where an input means (e.g., user's finger or stylus) is contacted over at least a partial area of the key corresponding to the location where the input means is contacted, in response to reception of information indicating that the input means is contacted from the external electronic device 210. The processor 310 may select a first key (e.g., 'g') from the plurality of derived keys in response to reception of information indicating that the input means is released without a drag from the external electronic device 210, and may select a second key (e.g., '4') from the plurality of derived keys in response to reception of information indicating that the input means is released after a drag from the external electronic device 210 in a direction of 5 o'clock.

In operation 730, the processor 310 may receive information regarding a first touch input from the external electronic device 210. In various embodiments, the processor 310 may receive the information regarding the first touch input from the external electronic device 210 while the virtual keyboard is displayed. The first touch input may be an input selecting at least one character from the plurality of characters indicated by the plurality of keys within the virtual keyboard. The first touch input may be an input for displaying or inputting the at least one character among the plurality of characters indicated by the plurality of keys within the virtual keyboard, on or to at least a portion of the omnidirectional image. The information regarding the first touch input may be transmitted by the external electronic device 210 in response to detection, by the external electronic device 210, of the first touch input to the touch pad of the external electronic device 210.

In operation 740, the processor 310 may identify the key corresponding to the first touch input among the plurality of keys included in the virtual keyboard. In various embodiments, the processor 310 may identify the key corresponding to the first touch input based on the received information regarding the first touch input. For example, the processor 310 may identify a key disposed at a virtual location corresponding to a real location where the first touch input, the virtual location thereby indicating a particular key from among the plurality of keys. The indicated key then is the key corresponding to the first touch input.

In operation 750, the processor 310 may display a character indicated by the identified key over at least a portion of the omnidirectional image. In various embodiments, the processor 310 may provide information regarding the character indicated by the identified key to the other application. For example, referring to FIG. 10, the external electronic device 210 may detect a touch input 1000 to a partial area of the touch pad of the external electronic device 210. The external electronic device 210 may transmit information regarding the touch input 1000 to the electronic device 101 in response to the detection of the touch input 1000. The processor 310 may identify a key corresponding to the touch input 1000 among the plurality of keys on the basis of at least the information regarding the touch input 1000. The processor 310 may provide information regarding the key or information regarding the character indicated by the key to the other application for providing the visual object, in response to the identification of the key corresponding to the touch input 1000. For example, the processor 310 may display a screen 1010, using the other application. The screen 1010 may include a visual object 1015. The other application may provide a 2D screen within the electronic device 101 when it is not used for VR. The visual object 1015 may be displayed within the screen 1010 through the other application configured to provide the 2D screen. The screen 1010 may further include another visual object (not shown). The other visual object may be a component of the omnidirectional image. The other visual object may be displayed within the screen 1010 through the application configured to provide a 3D screen. The screen 1010 may include the representation 820 of the external electronic device 210 superimposed on the omnidirectional image 810. The representation 820 may include the virtual keyboard 840 included in the virtual touch pad 830. The processor 310 may display 'j' indicated by the identified key, within a character input portion within the visual object 1015 in the omnidirectional image, in response to the identification of the key corresponding to the touch input 1000. In various embodiments, the processor 310 may display a visual effect in response to the identification of the key corresponding to the touch input 1000. For example, referring to FIG. 10, the processor 310 may display a visual effect 1020 indicating that the identified key is pressed (or selected) by the touch input 1000 in an area (e.g., boundary of the identified key) associated with the identified key, in response to the identification of the key corresponding to the touch input 1000.

Although not shown in FIG. 7, the processor 310 may provide the information regarding the character to another entity when the character is displayed and then the character is input to the visual object or the like. For example, when the visual object is associated with retrieval, the processor 310 may provide the information regarding the character to an application for retrieval stored within another electronic device (e.g., server) or the electronic device 101. The processor 310 may provide information acquired from the application for retrieval stored in the other electronic device or the electronic device 101, via the display 340.

As described above, the electronic device 101 according to various embodiments may input the character within the omnidirectional image using the virtual keyboard included in the representation of the external electronic device 210 displayed in the electronic device 101, based on the touch input received through the external electronic device 210. The virtual keyboard may assist a user with a limited FOV due to viewing of the omnidirectional image. Such assistance may provide convenience to the user.

Figure 11:
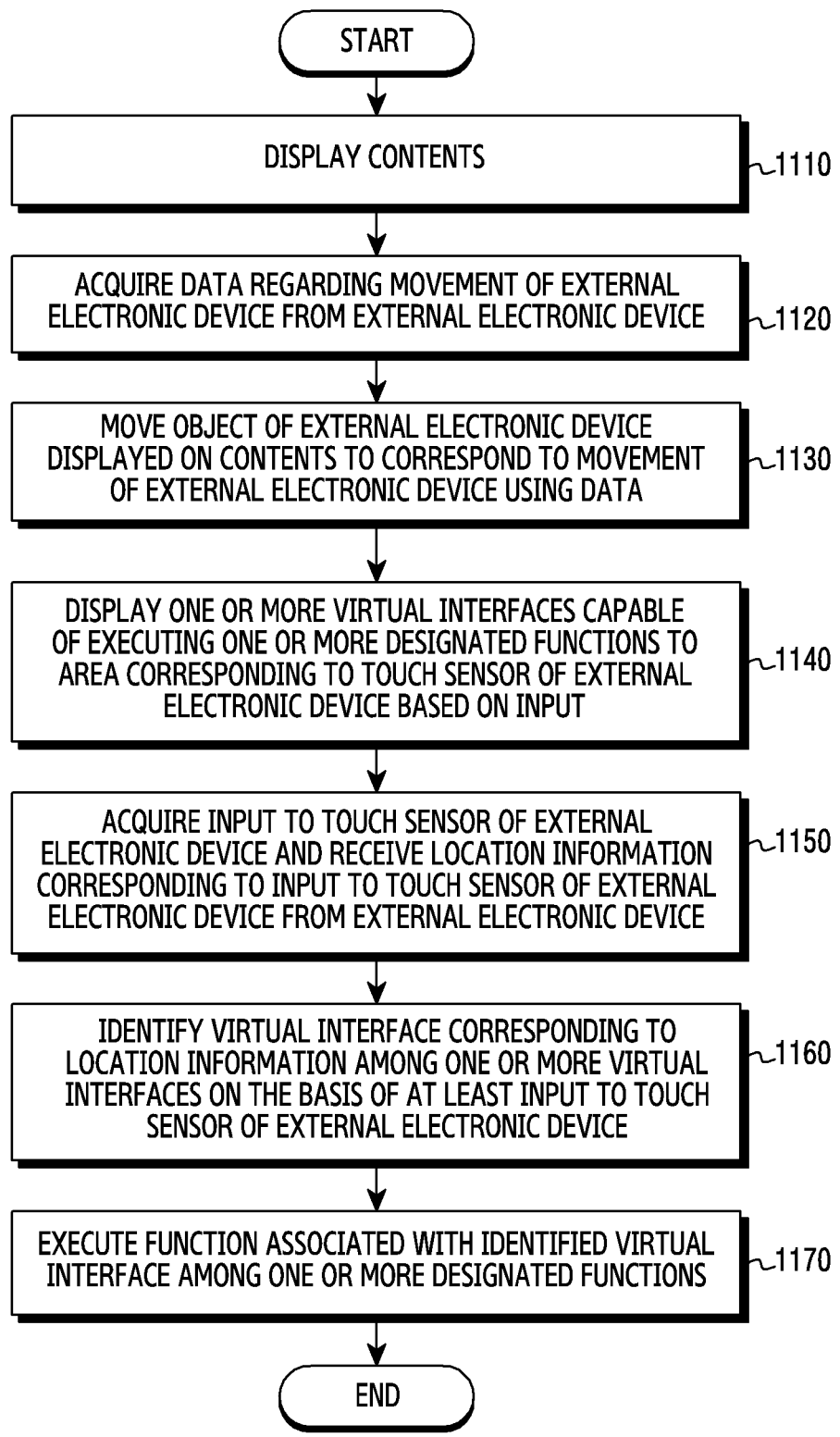
FIG. 11 illustrates another example of the operation of an electronic device according to various embodiments.

FIG. 11 illustrates another example of the operation of an electronic device according to various embodiments. This operation may be performed by the processor 310 within the electronic device 101 or the electronic device 101 shown in FIG. 3.

Referring to FIG. 11, in operation 1110, the processor 310 may display contents through the display 340. The contents may be displayed for a VR service.

In operation 1120, the processor 310 may acquire data regarding the movement of the external electronic device 210 from the external electronic device 210. In various embodiments, the processor 310 may acquire the data regarding the movement of the external electronic device 210 from the external electronic device 210 while an object (or graphic object) corresponding to the shape of the external electronic device is displayed over at least a portion of the contents. The processor 310 may receive the data regarding the movement of the external electronic device 210 from the external electronic device 210, through a connection between the electronic device 101 and the external electronic device 210.

In operation 1130, the processor 310 may move the virtual object representing the external electronic device 210 within the displayed imagery (e.g., a virtual environment) such that the movement corresponds to real-world movement of the external electronic device 210, using the received data. For example, the processor 310 may change an orientation of the object of the external electronic device 210 within the displayed imagery, to mirror a change in the real-world orientation of the external electronic device 210. By way of another example, the processor 310 may change a location of the object of the external electronic device 210 as displayed over the contents, to correspond to a distance for which the external electronic device 210 is moved in the real-world and a direction in which the external electronic device 210 is moved in the real-world.

In operation 1140, the processor 310 may display one or more virtual interfaces capable of executing one or more designated functions. The one or more virtual interfaces may be displayed to an area in the displayed imagery having a shape corresponding to the touch sensor of the external electronic device 210, based at least on the input. For example, the processor 310 may display the one or more virtual interfaces within the area corresponding to the touch sensor of the external electronic device 210. By way of another example, the processor 310 may display the one or more virtual interfaces in the vicinity of the area corresponding to the touch sensor of the external electronic device 210. In various embodiments, the input may be caused by the electronic device 101. For example, the input may be a user input for activating the character input portion within the contents displayed in the electronic device 101. By way of another example, the input may be a user input for selecting the character input portion. In various embodiments, the one or more virtual interfaces may be configured to input the character over at least a portion of the displayed contents. For example, the one or more virtual interfaces may correspond to one or more keys (or executable object) included in the virtual keyboard. The one or more designated functions may indicate that one or more characters are input over at least a portion of the displayed contents.

In operation 1150, the processor 310 may acquire an input to the touch sensor of the external electronic device 210 and location information corresponding to the input to the touch sensor of the external electronic device 210 from the external electronic device 210, via the communication interface 330. For example, the processor 310 may receive information indicating that the input to the touch sensor of the external electronic device 210 is detected and information regarding a location at which the input is detected, from the external electronic device 210 via the communication interface 330.

In operation 1160, the processor 310 may confirm a virtual interface corresponding to the acquired location information among the one or more virtual interfaces, based on the input to the touch sensor of the external electronic device 210. The processor 310 may invoke mapping information stored in memory 320 on the basis of at least information indicating that the input to the touch sensor of the external electronic device 210 is detected. The processor 310 may identify the virtual interface corresponding to the location information by searching for the mapping information using the acquired location information.

In operation 1170, the processor 310 may execute a function associated with the virtual interface among the one or more designated functions. For example, the processor 310 may input (or display), to the contents, the character corresponding to the identified virtual interface among the one or more characters corresponding to the one or more virtual interfaces.

The electronic device 101 according to various embodiments may move the object of the external electronic device 210 displayed within the electronic device 101 on the basis of at least information received from the external electronic device 210, or may execute a function associated with a specific virtual interface among the one or more virtual interfaces included in the object of the external electronic device 210.

Figure 12:
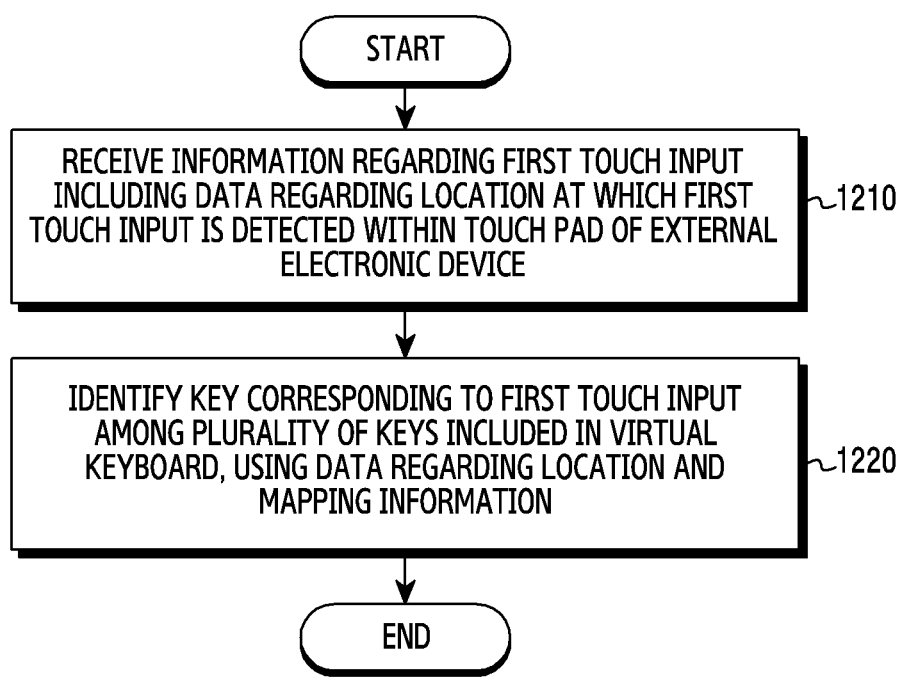
FIG. 12 illustrates an example of the operation of an electronic device that identifies a key corresponding to a touch input among a plurality of keys included in a virtual keyboard according to various embodiments.

FIG. 12 illustrates an example of the operation of an electronic device that identifies a key corresponding to a touch input among a plurality of keys included in a virtual keyboard according to various embodiments. This operation may be performed by the processor 310 within the electronic device 101 or the electronic device 101 shown in FIG. 3.

Operations 1210 and 1220 shown in FIG. 12 may be associated with operation 740 shown in FIG. 7.

Referring to FIG. 12, in operation 1210, the processor 310 may receive information regarding the first touch input including data regarding a location at which the first touch input is detected within the touch pad of the external electronic device 210. For example, the data may be configured with coordinates indicating a specific point or a specific area within the touch pad of the external electronic device 210. For example, the coordinates may be Cartesian coordinates configured with (X, Y).

In operation 1220, the processor 310 may identify a key corresponding to the first touch input among a plurality of keys included in the virtual keyboard, using the data regarding the location and the mapping information. In various embodiments, the processor 310 may invoke the mapping information stored in the memory 320 in response to reception of the information regarding the first touch input. The mapping information may include a plurality of coordinates for a plurality of areas into which the entire area occupied by the touch pad of the external electronic device 210 is divided. The mapping information may include coordinates of the plurality of keys associated with each of the plurality of coordinates. The processor 310 may determine coordinates corresponding to a location at which the first touch input represented by the data regarding the location is detected, among the plurality of coordinates for the plurality of areas. The processor 310 may determine coordinates of a key associated with the selected coordinates, among the coordinates of the plurality of keys. The processor 310 may identify the key corresponding to the first touch input among the plurality of keys, based on the determined coordinates of the key.

As described above, the electronic device 101 according to various embodiments may assist a user to more intuitively input a character, using the mapping information including data regarding a positional relationship between the plurality of areas into which the area occupied by the touch pad of the external electronic device 210 and the plurality of keys within the virtual keyboard.

Figure 13:
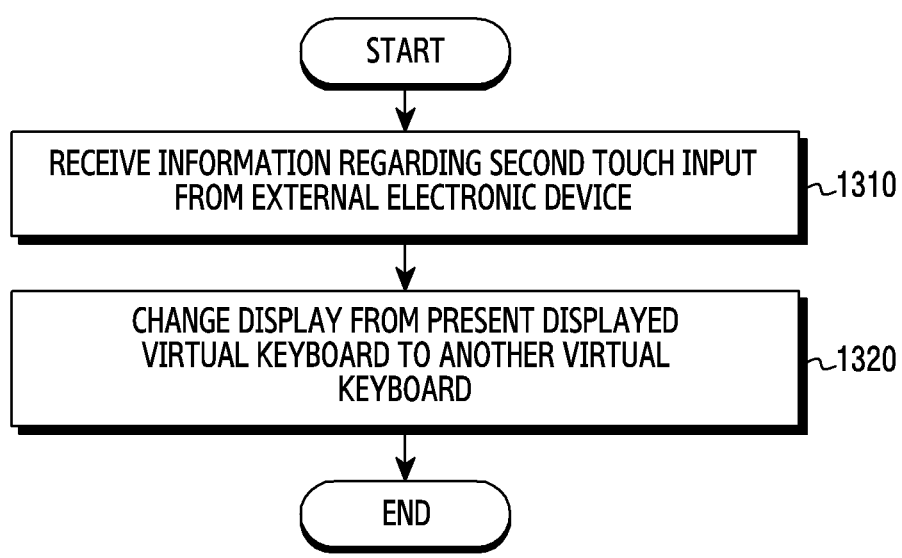
FIG. 13 illustrates an example of the operation of an electronic device that changes a displayed virtual keyboard to another virtual keyboard according to various embodiments.

FIG. 13 illustrates an example of the operation of an electronic device that changes a displayed virtual keyboard to another virtual keyboard according to various embodiments. This operation may be performed by the processor 310 within the electronic device 101 or the electronic device 101 shown in FIG. 3.

Figure 14:
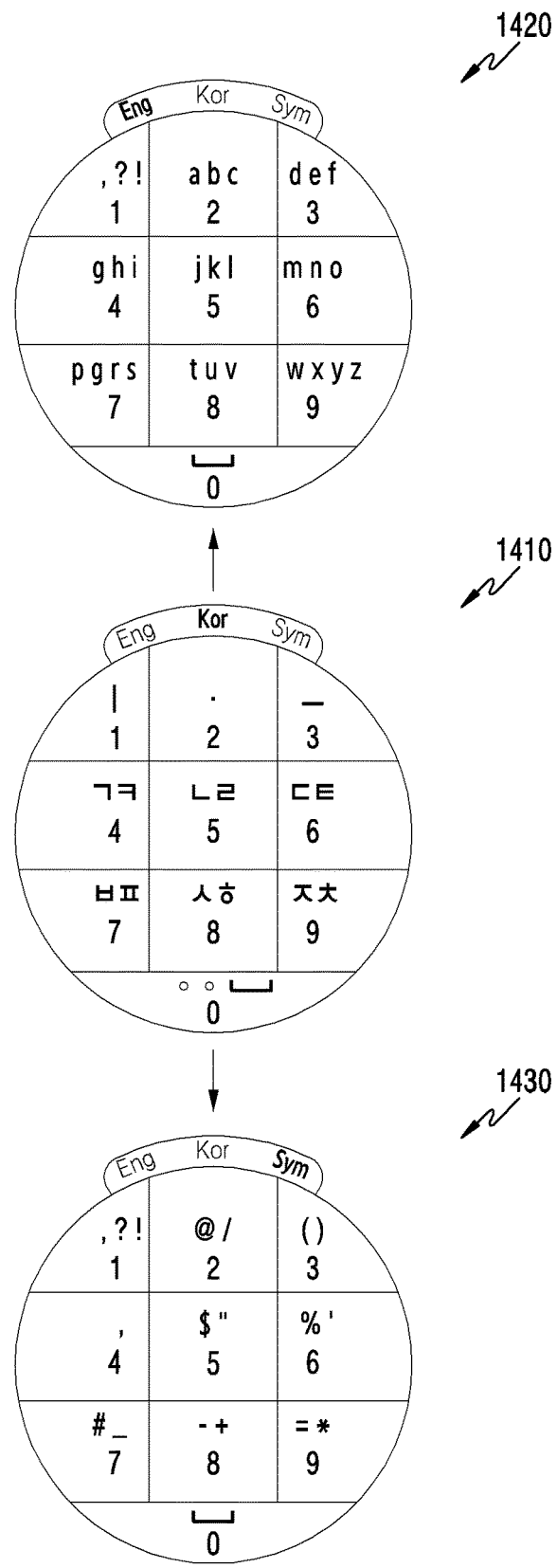
FIG. 14 illustrates an example in which a virtual keyboard is switched to another virtual keyboard in an electronic device according to various embodiments.

FIG. 14 illustrates an example in which a virtual keyboard is switched to another virtual keyboard in an electronic device according to various embodiments.

Figure 15:
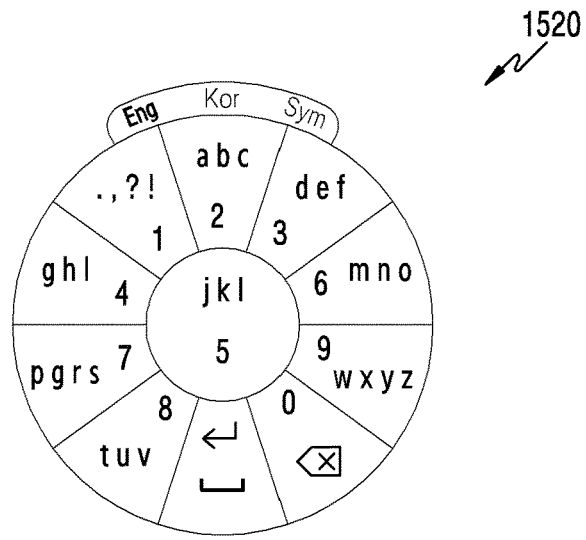
FIG. 15 illustrates another example in which a virtual keyboard is switched to another virtual keyboard in an electronic device according to various embodiments.
Figure 15:
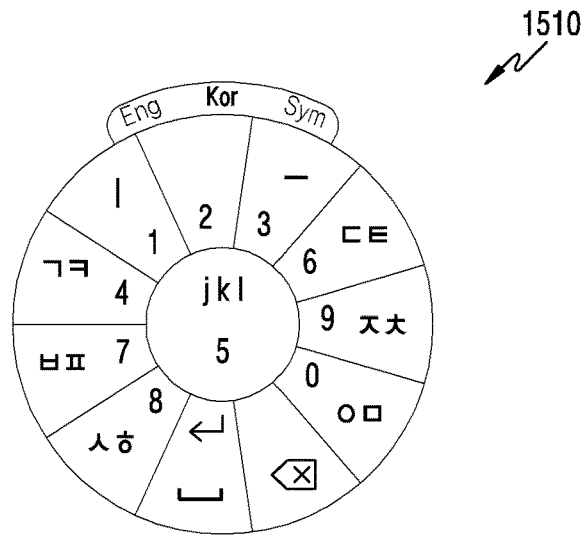
Figure 15:
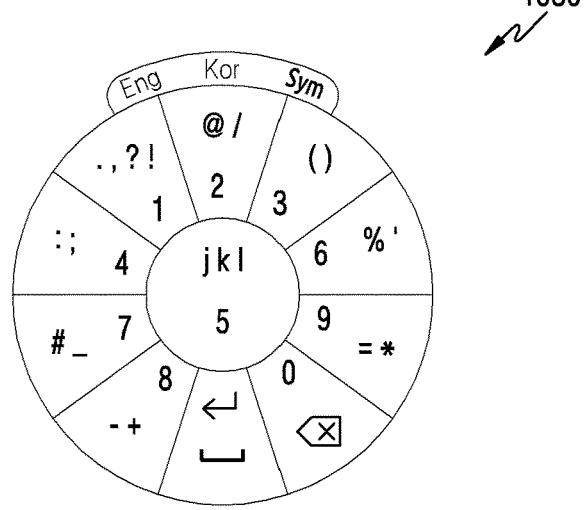

FIG. 15 illustrates another example in which a virtual keyboard is switched to another virtual keyboard in an electronic device according to various embodiments.

Referring to FIG. 13, in operation 1310, the processor 310 may receive information regarding a second touch input from the external electronic device 210. The information regarding the second touch input may be transmitted from the external electronic device 210 in response to detection of the second touch input to the touch pad of the external electronic device 210 by the external electronic device 210. The second touch input may be distinct from the first touch input for inputting the character through the virtual keyboard. For example, the second touch input may correspond to a drag input in a first direction or a second direction for the touch pad of the external electronic device 210 while the first touch input corresponds to at least one tap input to a partial area of the touch pad of the external electronic device 210. By way of another example, the second touch input may correspond to a multi-tap input to the partial area of the touch pad of the external electronic device 210 while the first touch input corresponds to a single tap input to the partial area of the touch pad of the external electronic device 210.

In operation 1320, the processor 310 may display another virtual keyboard. That is, the display 340 may be changed from displaying the virtual keyboard to displaying another virtual keyboard. In various embodiments, the processor 310 may change or switch the virtual keyboard to the other virtual keyboard based on reception of the information regarding the second touch input.

For example, referring to FIG. 14, the processor 310 may display a first virtual keyboard 1410 having a format of a feature phone keyboard within the representation of the external electronic device 210. The processor 310 may receive the information regarding the second touch input from the external electronic device 210 while the first virtual keyboard 1410 is displayed. The processor 310 may change the first virtual keyboard 1410 to another virtual keyboard in response to reception of the information regarding the second touch input. For example, when the second touch input corresponds to the drag input (or double tap input) in the first direction, the processor 310 may change the first virtual keyboard 1410 to the second virtual keyboard 1420 having the format of the feature phone keyboard in response to reception of the information regarding the second touch input. A plurality of characters that can be input through the second virtual keyboard 1420 may be associated with a second language while a plurality of characters that can be input through the first virtual keyboard 1410 is associated with a first language. By way of another example, when the second touch input corresponds to the drag input (or triple tap input) in the second direction, the processor 310 may change the first virtual keyboard 1410 to a third virtual keyboard 1430 having the format of the feature phone keyboard in response to the reception of the information regarding the second touch input. A plurality of characters that can be input through the third virtual keyboard 1430 may be associated with a symbol while the plurality of characters that can be input through the first virtual keyboard 1410 is associated with the first language.

By way of another example, referring to FIG. 15, the processor 310 may display the first virtual keyboard 1510 having a format of a radial keyboard within the representation of the external electronic device 210. The processor 310 may receive the information regarding the second touch input from the external electronic device 210 while the first virtual keyboard 1510 is displayed. The processor 310 may change the first virtual keyboard 1510 to another virtual keyboard in response to the reception of the information regarding the second touch input. For example, when the second touch input corresponds to the drag input (or double tap input) in the first direction, the processor 310 may change the first virtual keyboard 1510 to the second virtual keyboard 1520 having the format of the radial keyboard in response to the reception of the information regarding the second touch input. The plurality of characters that can be input through the second virtual keyboard 1520 may be associated with the second language while the plurality of characters that can be input through the first virtual keyboard is associated with the first language. By way of another example, when the second touch input corresponds to the drag input (or triple tap input) in the second direction, the processor 310 may change the first virtual keyboard 1510 to the third virtual keyboard 1530 having the format of the radial keyboard in response to the reception of the information regarding the second touch input. A plurality of characters that can be input through the third virtual keyboard 1530 may be associated with a third language while the plurality of characters that can be input through the first virtual keyboard 1510 is associated with the first language.

In various embodiments, the second touch input may be replaced with another touch input. For example, the other touch input may be a user's gesture that is performed in a state in which the physical button of the external electronic device 210 is pressed. In this case, the external electronic device 210 may transmit information regarding the input to the physical button and information regarding the movement of the external electronic device 210 according to the gesture to the electronic device 101. The processor 310 may display the second virtual keyboard 1420 (or second virtual keyboard 1520) changed from the first virtual keyboard 1410 (or first virtual keyboard 1510) based on information received from the external electronic device 210, or may display the third virtual keyboard 1430 (or third virtual keyboard 1530) changed from the first virtual keyboard 1410 (or first virtual keyboard 1510).

As described above, the electronic device 101 according to various embodiments may switch the virtual keyboard to another virtual keyboard based on the second touch input that is caused within the external electronic device 210 and has a different attribute from the attribute of the first touch input, so that a user whose FOV is blocked due to viewing of the omnidirectional image can intuitively change the virtual keyboard.

Figure 16:
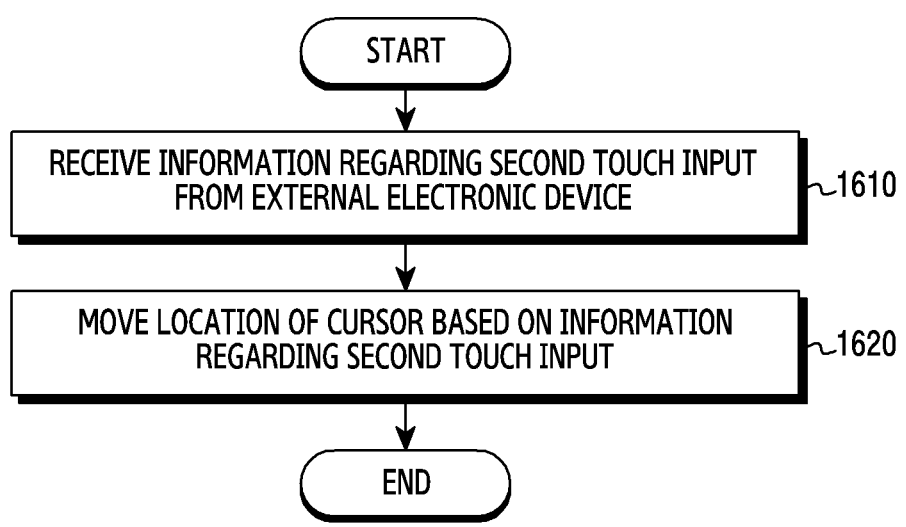
FIG. 16 illustrates an example of the operation of an electronic device that moves the location of a cursor through a virtual keyboard according to various embodiments.

FIG. 16 illustrates an example of the operation of an electronic device that moves the location of a cursor through a virtual keyboard according to various embodiments. This operation may be performed by the electronic device 101 shown in FIG. 3 and the processor 310 within the electronic device 101.

Figure 17:
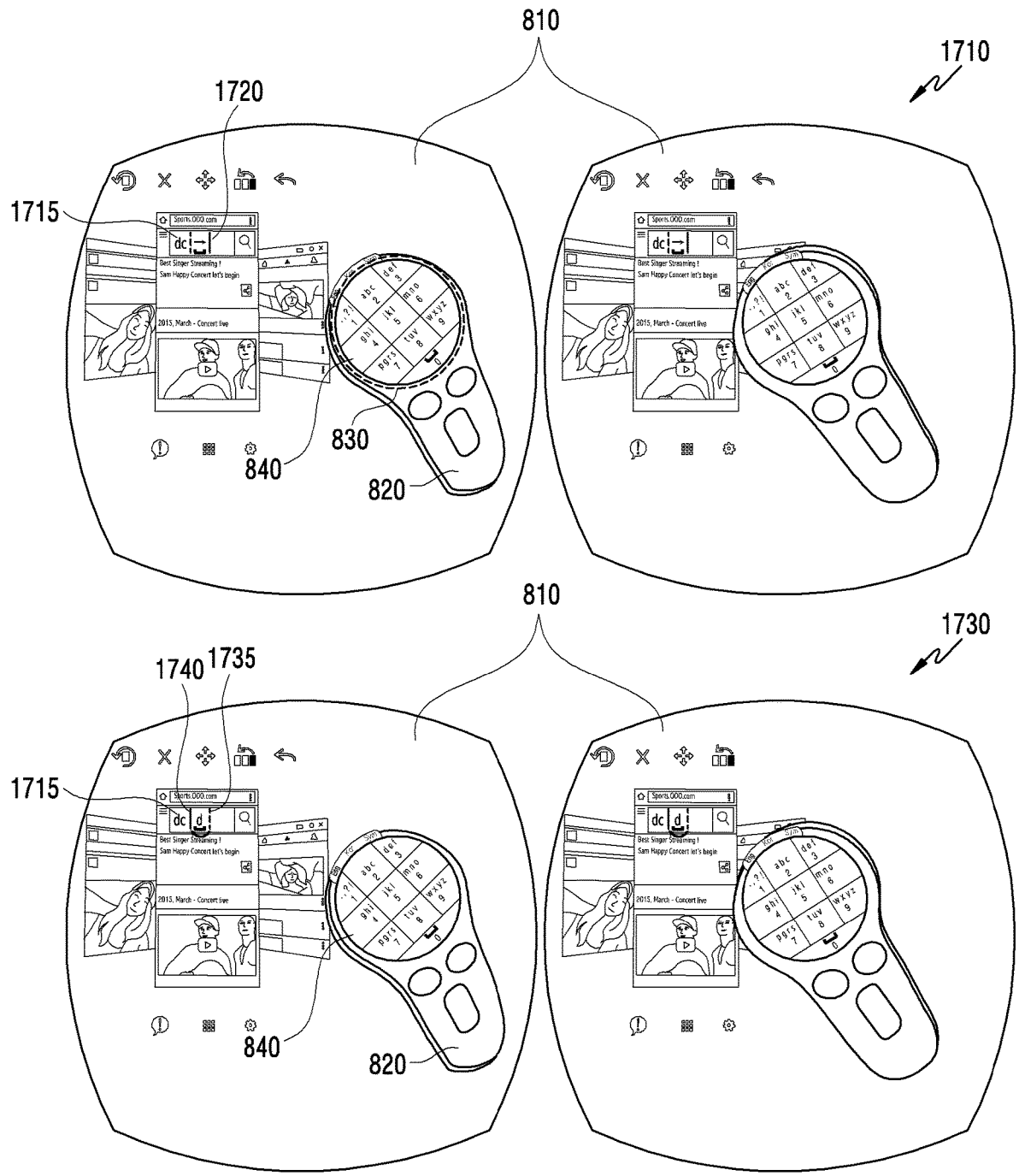
FIG. 17 illustrates an example in which the location of a cursor is moved in an electronic device according to various embodiments.

FIG. 17 illustrates an example in which the location of a cursor is moved in an electronic device according to various embodiments.

Referring to FIG. 16, the processor 310 may receive information regarding a second touch input from the external electronic device 210. The information regarding the second touch input may be transmitted from the external electronic device 210 in response to detection of the second touch input to the touch pad of the external electronic device 210 by the external electronic device 210. The second touch input may be distinct from the first touch input for inputting a character through the virtual keyboard. For example, the second touch input may correspond to a drag input in a third direction or a fourth direction for the touch pad of the external electronic device 210 while the first touch input corresponds to a tap input to a partial area of the touch pad of the external electronic device 210. By way of another example, the second touch input may correspond to a multi-tap input to the partial area of the touch pad of the external electronic device 210 while the first touch input corresponds to a single tap input to the partial area of the touch pad of the external electronic device 210.

In operation 1620, the processor 310 may move a location of a cursor displayed within a character input portion included in the omnidirectional image, based on the information regarding the second touch input. In various embodiments, the processor 310 may move the location of the cursor displayed within the character input area included in the omnidirectional image, based on reception of the information regarding the second touch input.

For example, referring to FIG. 17, the processor 310 may display a screen 1710. FIG. 17 shows the screen 1710 for one view position among view positions of both of a user's eyes, but this may be merely an example for illustration. In various embodiments, the processor 310 may further display a screen which corresponds to the screen 1710 and is for the other view position of the user. The processor 310 may receive the information regarding the second touch input from the external electronic device 210 while the screen 1710 is displayed. The processor 310 may move the cursor 1720 displayed in a text input portion 1715, in response to the reception of the information regarding the second touch input. For example, when the second touch input corresponds to the drag input (or double tap input) in the third direction, the processor 310 may move the cursor 1720 displayed subsequent to 'c' of the text input portion 1715 to the right by one space. The screen 1710 of FIG. 17 shows an example in which the cursor 1720 is moved to the right by one space based on the second touch input, but this is for convenience of description. The processor 310 may move the cursor 1720 to the right by n spaces (n being a natural number of 2 or larger) corresponding to the drag length of the drag input, based on the second touch input corresponding to the drag input in the third direction, for example, based on a user input such as swiping to the right.

By way of another example, referring to FIG. 17, the processor 310 may display a screen 1730. The processor 310 may receive the information regarding the second touch input from the external electronic device 210 while the screen 1730 is displayed. The processor 310 may move the cursor 1740 displayed in the text input portion 1715 from a location 1735, in response to the reception of the information regarding the second touch input. For example, when the second touch input corresponds to the drag input (or triple tap input) in the fourth direction, the processor 310 may move the cursor 1740 displayed subsequent to 'd' of the text input portion 1715 from the location 1735 to the left by one space. For example, when the second touch input corresponds to the drag input (or triple tap input) in the fourth direction, the processor 310 may delete 'd' while moving the cursor 1740 displayed subsequent to 'd' of the text input portion 1715 to the left by one space from the location 1735. The screen 1730 of FIG. 17 shows an example in which the cursor 1740 is moved to the left by one space based on the second touch input, but this is for convenience of description. The processor 310 may move the cursor 1740 to the left by n spaces (n being a natural number of 2 or larger) corresponding to the drag length of the drag input, based on the second touch input corresponding to the drag input in a direction of 4 o'clock.

Although not shown in FIGS. 16 and 17, the operations described with reference to FIGS. 16 and 17 may be performed based on the gesture of the user using the external electronic device 210. For example, the processor 310 may receive information regarding the movement of the external electronic device 210 caused by the user's gesture from the external electronic device 210. The processor 310 may modify or delete text displayed within an input area which is being displayed through the display 340, on the basis of at least the received information. For example, when a user repeatedly performs an operation of shaking the external electronic device 210 up or down while pressing a specific key of a controller such that the user erases a blackboard in a text input mode, the electronic device 101 may delete all text input by the user from the input area, on the basis of at least the information regarding the movement of the external electronic device 210 received from the external electronic device 210. By way of another example, when a user rapidly moves the external electronic device 210 up or down while pressing the specific key of the external electronic device 210, the electronic device 101 may move the location of the cursor within the input area up or down one paragraph, on the basis of at least the information regarding the movement of the external electronic device 210 received from the external electronic device 210.

As described above, the electronic device 101 according to various embodiments may move the cursor based on the second touch input which is caused within the external electronic device 210 and has a different attribute from the attribute of the first touch input, so that a user whose FOV is blocked due to viewing of the omnidirectional image can intuitively change the location of the cursor.

Figure 18:
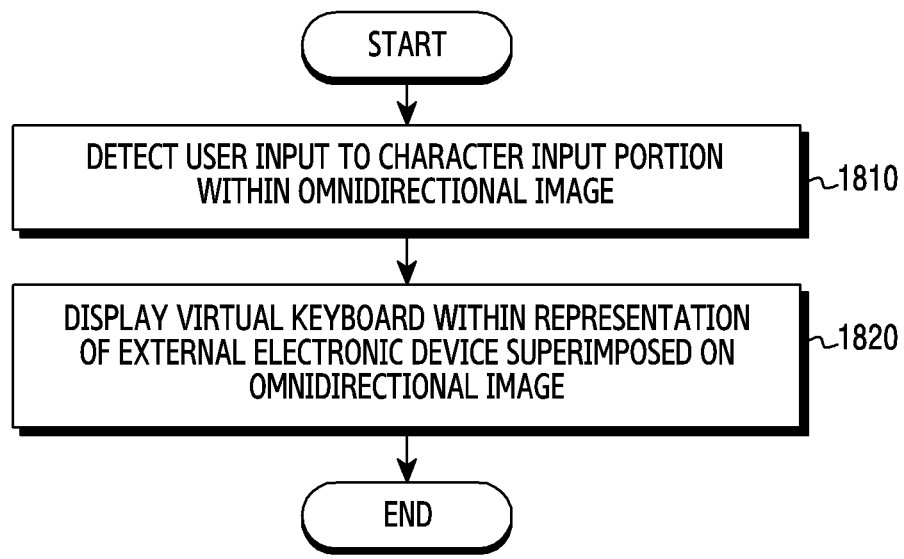
FIG. 18 illustrates an example of the operation of an electronic device that displays a virtual keyboard within a representation of an external electronic device according to various embodiments.

FIG. 18 illustrates an example of the operation of an electronic device that displays a virtual keyboard within a representation of an external electronic device according to various embodiments. This operation may be performed by the electronic device 101 shown in FIG. 3 or the processor 310 within the electronic device 101.

Operations 1810 and 1820 of FIG. 18 may be associated with operation 720 shown in FIG. 7.

Referring to FIG. 18, in operation 1810, the processor 310 may detect a user input to a character input portion within the omnidirectional image, using the virtual keyboard module (e.g., virtual keyboard module shown in FIG. 5) included in the middleware stored in the memory 320. In various embodiments, the processor 310 may detect a user input for selecting the character input portion within the omnidirectional image displayed through the display 340. In various embodiments, the user input may be caused based on user's gaze (user's attention or user's eyes). For example, the processor 310 may detect that the user's gaze is stopped at the character input portion for a specified time period.

In operation 1820, the processor 310 may display the representation of the external electronic device 210 superimposed on the omnidirectional image. The processor 310 may display the representation of the external electronic device 210 superimposed on the omnidirectional image, using the virtual keyboard module (e.g., virtual keyboard module shown in FIG. 5) included in the middleware stored in the memory 320 in response to the detection. The representation of the external electronic device 210 may include a virtual keyboard including a plurality of keys. The virtual keyboard may be disposed within an area occupied by the virtual touch pad within the representation. For example, the processor 310 (application and/or middleware) may add or load a 3D model object (e.g., planar shape) having the virtual keyboard shape to a 3D model object of the virtual touch pad. The 3D model object having the virtual keyboard shape may be disposed adjacent to the virtual touch pad. For example, the 3D model object having the virtual keyboard shape, which is disposed adjacent to the virtual touch pad, may be a texture model having a designated offset and having a transparent value.

By way of another example, the processor 310 may replace or change a texture image applied to the 3D model object of the virtual touch pad, using an application or middleware. For example, the processor 310 may map a 3D texture having the virtual keyboard shape to at least a portion of the virtual touch pad, using an application or middleware. The processor 310 may display, within at least a partial area of the virtual touch pad, the 3D texture having the virtual keyboard shape changed from the texture image previously applied to the at least the partial area of the virtual touch pad, based on the mapping.

As described above, the electronic device 101 according to various embodiments may monitor a situation in which the representation of the external electronic device 210 is to be displayed. The electronic device 101 may display the representation of the external electronic device 210 within the omnidirectional image, which is being reproduced, in response to detection of the situation in which the representation of the external electronic device 210 is to be displayed based on the monitored result, thereby providing enhanced UX.

Figure 19:
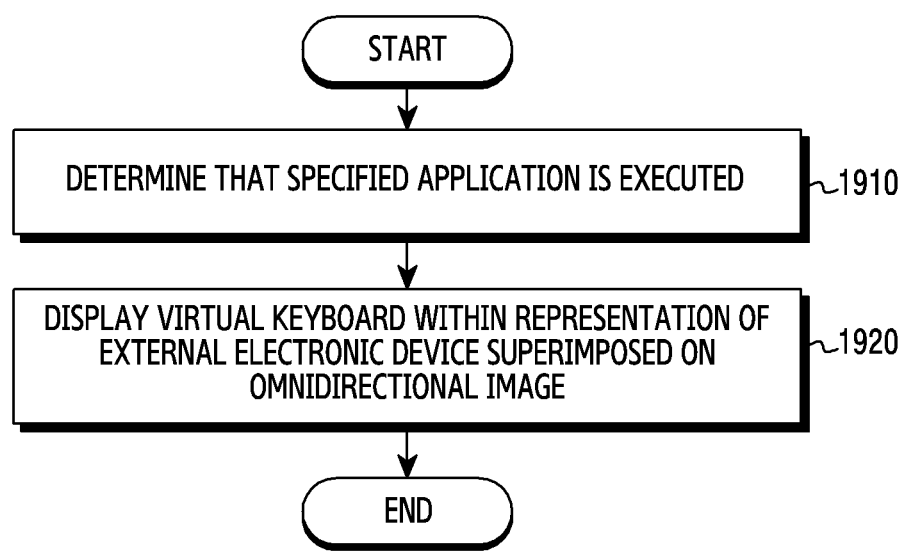
FIG. 19 illustrates another example of the operation of an electronic device that displays a virtual keyboard within a representation of an external electronic device according to various embodiments.

FIG. 19 illustrates another example of the operation of an electronic device that displays a virtual keyboard within a representation of an external electronic device according to various embodiments. This operation may be performed by the electronic device 101 shown in FIG. 3 or the processor 310 within the electronic device 101.

Operations 1910 and 1920 of FIG. 19 may be associated with operation 720 shown in FIG. 7.

Referring to FIG. 19, in operation 1910, the processor 310 may confirm that a specified application is executed within the electronic device 101. The specified application may be an application requesting an input of a character. The processor 310 may monitor signaling between the memory 320 and the processor 310 to confirm that the specified application is executed.

In operation 1920, the processor 310 may display the representation of the external electronic device 210 superimposed on the omnidirectional image displayed through the display 340. The processor 310 may display the representation of the external electronic device 210 superimposed on the omnidirectional image, using the virtual keyboard module (e.g., virtual keyboard module shown in FIG. 5) included in the middleware stored in the memory 320, in response to the confirmation. The representation of the external electronic device 210 may include a virtual keyboard including a plurality of keys. The virtual keyboard may be displayed on the virtual touch pad within the representation. For example, the processor 310 (application and/or middleware) may add or load a 3D model object (e.g., planar shape) having the virtual keyboard shape to a 3D model object of the virtual touch pad. The 3D model object having the virtual keyboard shape may be disposed adjacent to the virtual touch pad. For example, the 3D model object having the virtual keyboard shape, which is disposed adjacent to the virtual touch pad, may be a texture model having a designated offset and having a transparent value.

By way of another example, the processor 310 may replace or change a texture image applied to the 3D model object of the virtual touch pad, using an application or middleware. For example, the processor 310 may map a 3D texture having the virtual keyboard shape to at least a portion of the virtual touch pad, using an application or middleware. The processor 310 may display, within at least a partial area of the virtual touch pad, the 3D texture having the virtual keyboard shape changed from the texture image previously applied to the at least the partial area of the virtual touch pad, based on the mapping.

As described above, the electronic device 101 according to various embodiments may monitor signaling between the components within the electronic device 101, thereby monitoring a situation in which the representation of the external electronic device 210 is to be displayed. The electronic device 101 may display the representation of the external electronic device 210 within the omnidirectional image, which is being reproduced, in response to detection of the situation in which the representation of the external electronic device 210 is to be displayed based on the monitored result, thereby providing enhanced UX.

Figure 20:
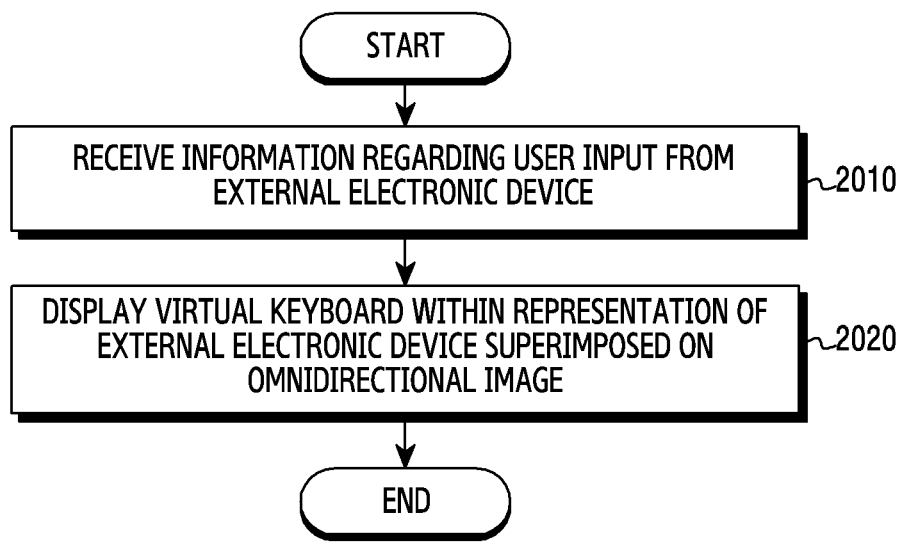
FIG. 20 illustrates still another example of the operation of an electronic device that displays a virtual keyboard within a representation of an external electronic device according to various embodiments.

FIG. 20 illustrates still another example of the operation of an electronic device that displays a virtual keyboard within a representation of an external electronic device according to various embodiments. This operation may be displayed by the electronic device 101 shown in FIG. 3 or the processor 310 within the electronic device 101.

Operations 2010 and 2020 of FIG. 20 may be associated with operation 720 shown in FIG. 7.

Referring to FIG. 20, in operation 2010, the processor 310 may receive information regarding a user input from the external electronic device 210. In various embodiments, the user input may be that the physical button of the external electronic device 210 is pressed. The information regarding the user input may be transmitted from the external electronic device 210 in response to detecting the user input to the physical button of the external electronic device 210 by the external electronic device 210.

In operation 2020, the processor 310 may display the representation of the external electronic device 210 superimposed on the omnidirectional image displayed through the display 340. The processor 310 may display the representation of the external electronic device 210 superimposed on the omnidirectional image displayed through the display 340, using the virtual keyboard module (e.g., virtual keyboard module shown in FIG. 5) included in the middleware stored in the memory 320, in response to the reception. The representation of the external electronic device 210 may include the virtual keyboard including a plurality of keys. The virtual keyboard may be displayed on the virtual touch pad within the representation.

For example, the processor 310 (application and/or middleware) may add or load a 3D model object (e.g., planar shape) having the virtual keyboard shape to a 3D model object of the virtual touch pad. The 3D model object having the virtual keyboard shape may be disposed adjacent to the virtual touch pad. For example, the 3D model object having the virtual keyboard shape, which is disposed adjacent to the virtual touch pad, may be a texture model having a designated offset and having a transparent value.

By way of another example, the processor 310 may replace or change a texture image applied to the 3D model object of the virtual touch pad, using an application or middleware. For example, the processor 310 may map a 3D texture having the virtual keyboard shape to at least a portion of the virtual touch pad, using an application or middleware. The processor 310 may display, within at least a partial area of the virtual touch pad, the 3D texture having the virtual keyboard shape changed from the texture image previously applied to the at least the partial area of the virtual touch pad, based on the mapping.

As described above, the electronic device 101 according to various embodiments may monitor whether information regarding the user input detected by the external electronic device 210 is received from the external electronic device 210, thereby monitoring a situation in which the representation of the external electronic device 210 is to be displayed. The electronic device 101 may display the representation of the external electronic device 210 within the omnidirectional image, which is reproduced, in response to detecting the situation in which the representation of the external electronic device 210 is to be displayed based on the monitored result, thereby providing enhanced UX.

Figure 21:
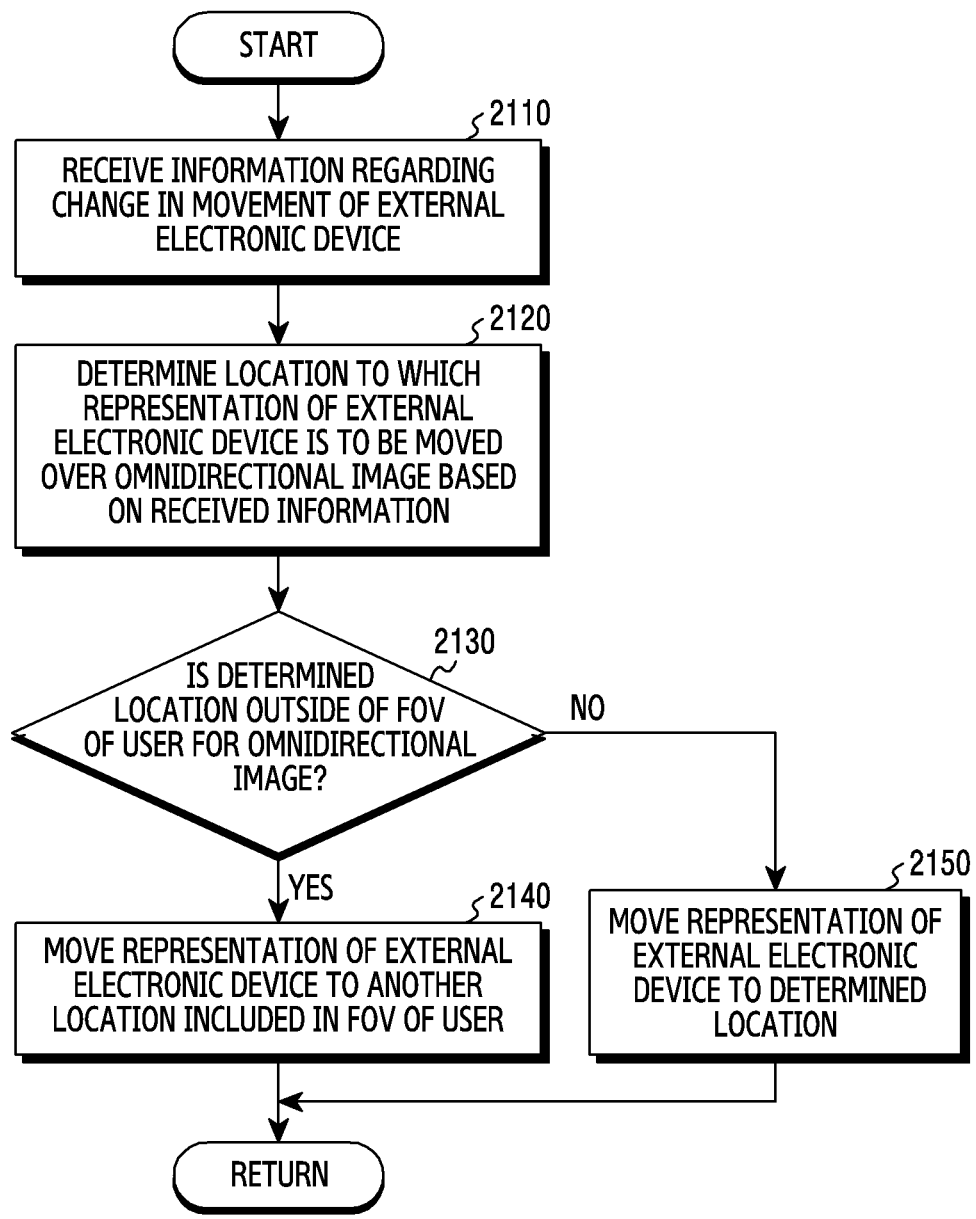
FIG. 21 illustrates an example of the operation of an electronic device that changes a location of a representation of an external electronic device according to various embodiments.

FIG. 21 illustrates an example of the operation of an electronic device that changes a location of a representation of an external electronic device according to various embodiments. This operation may be performed by the electronic device 101 of FIG. 3 or the processor 310 within the electronic device 101.

Figure 22:
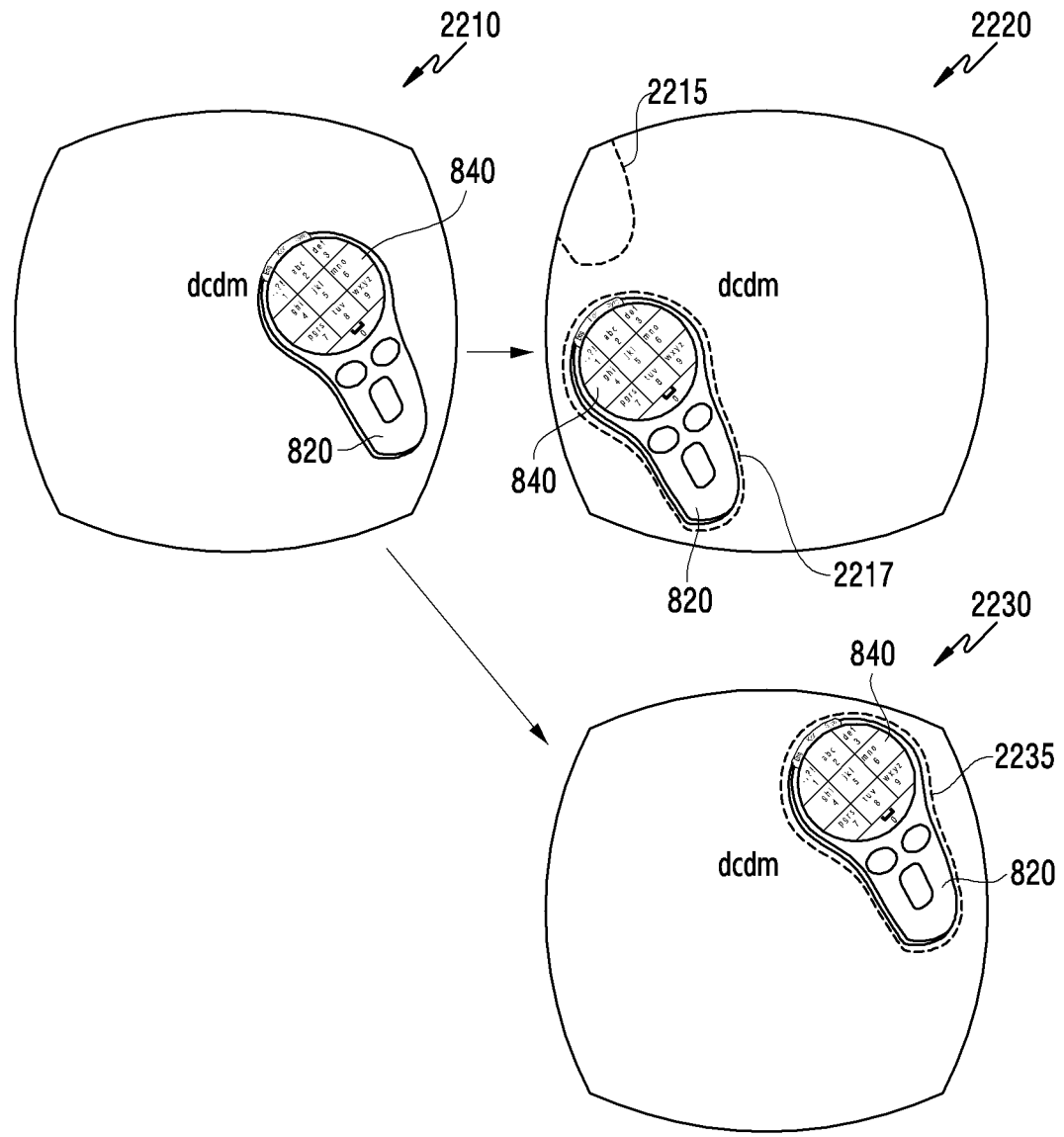
FIG. 22 illustrates an example in which the location of a representation of an external electronic device is changed in an electronic device according to various embodiments.

FIG. 22 illustrates an example in which the location of a representation of an external electronic device is changed in an electronic device according to various embodiments.

Referring to FIG. 21, in operation 2110, the processor 310 may receive information regarding a change in the movement of the external electronic device 210 from the external electronic device 210. The information regarding the change in the movement may include one or more of information regarding a change in the orientation of the external electronic device 210 and information regarding the movement of the location of the external electronic device 210.

In operation 2120, the processor 310 may determine a location to which the representation of the external electronic device 210 is to be moved over the omnidirectional image displayed through the display 340, based on the received information. For example, the information regarding the change in the movement may include data regarding a distance at which the external electronic device 210 is moved and data regarding a direction in which the external electronic device 210 is moved. In various embodiments, the processor 310 may determine a location of the representation of the external electronic device 210 to be changed according to the movement of the external electronic device 210, on the basis of at least the distance at which the external electronic device 210 is moved and the direction in which the external electronic device 210 is moved.

In operation 2130, the processor 310 may determine whether the determined location is outside of the FOV of a user for the omnidirectional image. For example, the processor 310 may identify an area occupied by the FOV of the user for the omnidirectional image. The processor 310 may determine that the determined location is outside of the FOV of the user for the omnidirectional image, based on identifying that at least a portion of the area occupied by the representation of the external electronic device 210 is not included in the area occupied by the FOD of the user. When it is determined that the determined location is outside of the FOV of the user for the omnidirectional image, the processor 310 may perform operation 2140. The processor 310 may determine that the determined location is within the FOV of the user for the omnidirectional image, based on identifying that the at least a portion of the area occupied by the representation of the external electronic device 210 is included in the area occupied by the FOV of the user. When it is determined that the determined location is within the FOV of the user for the omnidirectional image, the processor 310 may perform operation 2150.

In operation 2140, the processor 310 may move the representation of the external electronic device 210 to another location included in the FOV of the user, in response to determining that the determined location is outside of the FOV of the user for the omnidirectional image.

For example, referring to FIG. 22, the processor 310 may display the representation 820 of the external electronic device 210 including the virtual keyboard 840 within a screen 2210. The processor 310 may receive the information regarding the change in the movement of the external electronic device 210 from the external electronic device 210 while the screen 2210 is displayed. The processor 310 may determine that an area corresponding to the location to which the representation 820 of the external electronic device 210 is to be moved over the omnidirectional image is an area 2215 within a screen 2220 based on the received information. The processor 310 may move the representation 820 of the external electronic device 210 to an area 2217 instead of the area 2215 so that the representation 820 of the external electronic device 210 is included in the FOV of the user, based on determining that the area 2215 is outside of the FOV of the user.

In operation 2150, the processor 310 may move the representation of the external electronic device 210 to the determined location, in response to determining that the determined location is within the FOV of the user for the omnidirectional image.

For example, referring to FIG. 22, the processor 310 may display the representation 820 of the external electronic device 210 including the virtual keyboard 840 within the screen 2210. The processor 310 may receive the information regarding the change in the movement of the external electronic device 210 from the external electronic device 210 while the screen 2210 is displayed. The processor 310 may determine that an area corresponding to the location to which the representation 820 of the external electronic device 210 is to be moved over the omnidirectional image is an area 2235 within a screen 2230 based on the received information. The processor 310 may move the representation 820 of the external electronic device 210 to the area 2235, based on determining that the area 2235 is within the FOV of the user.

As described above, the electronic device 101 according to various embodiments may adaptively control the location of the representation of the external electronic device 210 so that the representation of the external electronic device 210 is located within the FOV of the user. Through this control, the electronic device 101 may provide extended UX.

A method of the electronic device according to various embodiments described above may include displaying contents through a display of the electronic device; acquiring data regarding movement of an external electronic device including a touch sensor through a communication module of the electronic device; moving a graphic object corresponding to a shape of the external electronic device displayed over at least a portion of the contents through the display to correspond to the movement, using the data; displaying one or more virtual interfaces capable of executing one or more functions to correspond to an area displayed in a shape corresponding to the touch sensor of the external electronic device among the graphic objects, through the display on the basis of at least an input; acquiring an input to the touch sensor and location information corresponding to the input to the touch sensor from the external electronic device through the communication module; identifying a virtual interface corresponding to the location information among the one or more virtual interfaces on the basis of at least the input to the touch sensor; and executing a function associated with the identified virtual interface among the one or more designated functions.

In various embodiments, the one or more virtual interfaces may be usable to input text over at least a portion of the displayed contents.

In various embodiments, the executing may include displaying text indicated by the identified virtual interface over the at least a portion of the contents.

In various embodiments, the displaying of the graphic object may include receiving the information regarding the user input transmitted from the external electronic device through the communication module in response to detecting the user input to the touch sensor by the external electronic device; and displaying the one or more virtual interfaces within the area displayed in the shape corresponding to the touch sensor of the external electronic device among the graphic objects, on the basis of at least the received information regarding the user input.

In various embodiments, the displaying of the graphic object may include displaying the one or more virtual interfaces within the area displayed in the shape corresponding to the touch sensor of the external electronic device among the graphic objects, in response to detecting that an object for inputting text is displayed within the displayed contents.

In various embodiments, the displaying of the graphic object may include receiving the information regarding the user input transmitted from the external electronic device through the communication module, in response to detecting a user input to a physical button of the external electronic device by the external electronic device; and displaying the one or more virtual interfaces within the area displayed in the shape corresponding to the touch sensor of the external electronic device among the graphic objects, on the basis of at least the received information regarding the user input.

A method of the electronic device according to various embodiments described above may include: displaying an omnidirectional image; displaying a virtual keyboard including a plurality of keys indicating a plurality of characters within an area associated with a virtual touch pad corresponding to a touch pad of the external electronic device included in a representation of the external electronic device superimposed on the omnidirectional image; receiving information regarding a first touch input to the touch pad transmitted from the external electronic device in response to detecting the first touch input to the touch pad by the external electronic device; identifying a key corresponding to the first touch input among the plurality of keys based on the reception; and displaying a character indicated by the identified key over at least a portion of the omnidirectional image.

In various embodiments, the method may further include receiving information regarding a second touch input, such that the information regarding the second touch input is transmitted from the external electronic device in response to detecting the second touch input on the touch pad in the external electronic device; and based on the reception of the information regarding the second touch input, displaying another virtual keyboard changed from the virtual keyboard including the plurality of characters, such that the other virtual keyboard includes a plurality of other keys indicating a plurality of other characters, such that the first touch input corresponds to at least one tap input on a partial area of the touch pad, and such that the second touch input corresponds to a drag input in a first direction or a second direction on the touch pad.

In various embodiments, the method may further include, after identifying the key, displaying, and an area associated with the identified key, a visual effect indicating that the identified key is depressed by the first touch input.

In various embodiments, the identifying of the key may include receiving, from the external electronic device, the information regarding the first touch input that includes data regarding a location in which the first touch input is detected in the touch pad; and, based on the reception, identifying the key corresponding to the first touch input among the plurality of keys by using the data regarding the location.

In various embodiments, the method may further include receiving information regarding change of movement of the external electronic device, such that the information regarding the change of the movement of the external electronic device is transmitted from the external electronic device in response to detecting the change of the movement of the external electronic device in the external electronic device; and moving the representation of the external electronic device, based on the information regarding the change of the movement of the external electronic device. In various embodiments, the moving of the representation of the external electronic device may include: determining, based on the information regarding the change of the movement of the external electronic device, a location to which the representation of the external electronic device is to be moved on the image; identifying whether the determined location is outside of a field of view (FOV) of a user for the image; based on identifying that the determined location is outside of the FOV of the user for the image, move the representation of the external electronic device to another location that is included in the FOV; and based on identifying that the determined location is within the FOV of the user for the image, move the representation of the external electronic device to the determined location.

In various embodiments, the method may further include: displaying a cursor subsequent to the character within a text input portion included in the image; receiving information regarding a second touch input, such that the information regarding the second touch input is transmitted from the external electronic device in response to detecting the second touch input in the external electronic device; and moving a location of the cursor, based on the information regarding the second touch input, such that the first touch input corresponds to at least one tap input on a partial area of the touch pad, and such that the second touch input corresponds to a drag input in a first direction and a second direction on the touch pad.

In various embodiments, the displaying of the virtual keyboard may include display the virtual keyboard within the virtual touch pad included in the representation that is superimposed on the image, in response to detecting a user input on the text input portion in the image while displaying the image, and such that the text input portion is provided in the image through a second application different from a first application used for providing the image.

In various embodiments, the displaying of the virtual keyboard may include displaying the virtual keyboard within the area associated with the virtual touch pad included in the representation that is superimposed on the image, in response to identifying to execute a specified application in the electronic device while displaying the image.

In various embodiments, the displaying of the virtual keyboard may include: receiving the information regarding the user input transmitted from the external electronic device in response to detecting the user input to the physical button of the external electronic device by the external electronic device while the omnidirectional image is displayed; and displaying the virtual keyboard within the virtual touch pad included in the representation superimposed on the omnidirectional image, in response to the reception of the information regarding the user input.

In various embodiments, the omnidirectional image may provide VR.

In various embodiments, each of the plurality of characters may correspond to one or more of a letter, a symbol, and an emoticon.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device, comprising:
   a memory storing instructions;
   a display;
   a communication circuitry; and
   at least one processor operably coupled to the memory, the display, and the communication circuitry, the at least processor configured to execute the stored instructions to cause the electronic device to:
   display a virtual reality image using the display;
   display a virtual keyboard including a plurality of keys indicating a plurality of characters, and a representation of an external electronic device superimposed on the virtual reality image, wherein the virtual keyboard is displayed in a virtual touch pad area of the representation, corresponding to a touch pad of the external electronic device;
   receive information regarding a first touch input, the received information transmitted from the external electronic device in response to detecting the first touch input on the touch pad;

identify, using the received information, a key corresponding to the first touch input from among the plurality of keys;
display, in at least a portion of the virtual reality image, a character indicated by the identified key; and
based on detecting selection of a prespecified key combined with movement of an entirety of the external electronic device, altering the at least the portion of the virtual reality image in which the character indicated by the identified key is displayed.

2. The electronic device of claim 1, wherein the processor is further configured to execute the stored instructions to cause the electronic device to:
receive second information regarding a second touch input, the received second information transmitted from the external electronic device in response to detecting the second touch input on the touch pad in the external electronic device; and
change the virtual keyboard to a second virtual keyboard in response to receiving the second information,
wherein the second virtual keyboard includes a second plurality of keys indicating a second plurality of characters,
wherein the first touch input includes at least one tap input to a partial area of the touch pad,
wherein the second touch input includes a drag input moving in a first direction or a second direction along the touch pad, and
wherein a different function is executed to alter the at least the portion of the virtual reality image in response to the movement of the entirety of the external electronic device, depending on whether a first prespecified key or a second prespecified key is selected while the movement is detected.

3. The electronic device of claim 1, wherein the processor is further configured to execute the stored instructions to cause the electronic device to:
after identifying the key, display within an area associated with the identified key a visual effect indicating that the identified key is selected by the first touch input, and
wherein when the entirety of the external electronic device is moved vertically and a first prespecified key is selected, a cursor position is moved vertically through paragraphs displayed in the at least the portion of the virtual reality image.

4. The electronic device of claim 3, wherein the received information regarding the first touch input includes data indicating a location in which the first touch input is detected on the touch pad,
wherein the key is identified using the data indicating the location, and
wherein when the entirety of the external electronic device is moved vertically and a second prespecified key is selected different from the first prespecified key, an entirety of text displayed in the at least the portion of the virtual reality image is deleted.

5. The electronic device of claim 1, wherein the processor is further configured to execute the stored instructions to cause the electronic device to:
receive movement information indicating the movement of the external electronic device, wherein the movement information is transmitted by the external electronic device when detecting movement of the external electronic device in the external electronic device; and
move the representation of the external electronic device in the virtual reality image based on the received movement information.

6. The electronic device of claim 5, wherein the processor is further configured to execute the stored instructions to cause the electronic device to:
determine, based on the movement information, a location within the virtual reality image to which the representation will be moved;
detect whether the determined location is outside of field of view (FOV) of a user viewing the virtual reality image;
when the determined location is outside of the FOV of the user, move the representation of the external electronic device to a second location disposed within the FOV; and
when the determined location is within the FOV of the user, move the representation of the external electronic device to the determined location.

7. The electronic device of claim 1, wherein the processor is further configured to execute the stored instructions to cause the electronic device to:
when the character is displayed within a text input area of the virtual reality image, display a cursor substantially adjacent to the character within the text input area;
receive second information regarding a second touch input, wherein the second information is transmitted by the external electronic device in response to detecting the second touch input in the external electronic device; and
move a location of the cursor, based on the second information,
wherein the first touch input corresponds to at least one tap input to a partial area of the touch pad, and
wherein the second touch input corresponds to a drag input moving in a first direction and a second direction along the touch pad.

8. The electronic device of claim 1, wherein the virtual reality image further includes a text input region, provided through a second application different from a first application providing the virtual reality image, and
wherein the virtual keyboard is displayed within the virtual touch pad area in response to detecting a user input to the text input region.

9. The electronic device of claim 1, wherein the virtual keyboard is displayed within the virtual touch pad area in response to receiving a request to execute a specified application while displaying the virtual reality image.

10. The electronic device of claim 1, wherein the virtual keyboard is displayed within the virtual touch pad area in response to
receiving particular information regarding a user input transmitted by the external electronic device in response to detecting the user input to a physical button of the external electronic device.

11. The electronic device of claim 1, wherein the virtual reality image comprises an omnidirectional image.

12. The electronic device of claim 1, further comprising:
a housing configured to be mounted on a head of a user.

13. The electronic device of claim 1, wherein each of the plurality of characters corresponds to one or more of a letter, a symbol, and an emoticon.

14. A method for operating an electronic device, the method comprising:
displaying a virtual reality image;
displaying a virtual keyboard including a plurality of keys indicating a plurality of characters and a representation of an external electronic device superimposed on the virtual reality image, wherein the virtual keyboard is displayed in a virtual touch pad area of the representation, corresponding to a touch pad of the external electronic device;

receiving information regarding a first touch input, the received information transmitted from the external electronic device in response to detecting the first touch input on the touch pad;

identifying, using the received information, a key corresponding to the first touch input from among the plurality of keys;

displaying, in at least a portion of the virtual reality image, a character indicated by the identified key on at least portion of the image; and based on detecting selection of a prespecified key combined with movement of an entirety of the external electronic device, altering the at least the portion of the virtual reality image in which the character indicated by the identified key is displayed.

15. The method of claim 14, further comprising:

receiving second information regarding a second touch input, the received second information transmitted from the external electronic device in response to detecting the second touch input on the touch pad in the external electronic device; and changing the virtual keyboard to a second virtual keyboard in response to receiving the second information, wherein the second virtual keyboard includes a second plurality of keys indicating a second plurality of characters, wherein the first touch input includes at least one tap input to a partial area of the touch pad, wherein the second touch input includes a drag input moving in a first direction or a second direction along the touch pad, and wherein a different function is executed to alter the at least the portion of the virtual reality image in response to the movement of the entirety of the external electronic device, depending on whether a first prespecified key or a second prespecified key is selected while the movement is detected.

16. The method of claim 14, further comprising:

after identifying the key, displaying, within an area associated with the identified key, a visual effect indicating that the identified key is selected by the first touch input, wherein when the entirety of the external electronic device is moved vertically and a first prespecified key is selected, a cursor position is moved vertically through paragraphs displayed in the at least the portion of the virtual reality image.

17. The method of claim 16, wherein the received information regarding the first touch input includes data indicating a location in which the first touch input is detected on the touch pad, wherein the key is identified using the data indicating the location, and wherein when the entirety of the external electronic device is moved vertically and a second prespecified key is selected different from the first prespecified key, an entirety of text displayed in the at least the portion of the virtual reality image is deleted.

18. The method of claim 14, further comprising:

receiving movement information indicating a movement of the external electronic device, wherein the movement information is transmitted by the external electronic device in response to detecting movement of the external electronic device by the external electronic device; and moving the representation of the external electronic device in the virtual reality image, based on the received movement information.

19. The method of claim 18, wherein moving the representation of the external electronic device comprises:

determining based on the movement information, a location within the virtual reality image to which the representation will be moved;

detecting whether the determined location is outside of field of view (FOV) of a user viewing the virtual reality image;

when the determined location is outside of the FOV of the user, moving the representation of the external electronic device to a second location disposed within the FOV; and when the determined location is within the FOV of the user, moving the representation of the external electronic device to the determined location.

20. A non-transitory computer-readable storage medium storing one or more programs for executing to:

display a virtual reality image;

display a virtual keyboard including a plurality of keys indicating a plurality of characters, and a representation of an external electronic device superimposed on the virtual reality image, wherein the virtual keyboard is displayed in a virtual touch pad area of the representation, corresponding to a touch pad of the external electronic device;

receive information regarding a first touch input, the received information transmitted from the external electronic device in response to detecting the first touch input on the touch pad;

identify, using the received information, a key corresponding to the first touch input from among the plurality of keys;

display, in at least a portion of the virtual reality image, a character indicated by the identified key; and based on detecting selection of a prespecified key combined with movement of an entirety of the external electronic device, altering the at least the portion of the virtual reality image in which the character indicated by the identified key is displayed.

* * * * *